US012634727B2

(12) United States Patent
Akl et al.

(10) Patent No.: US 12,634,727 B2
(45) Date of Patent: May 19, 2026

(54) REPEATER MEASUREMENT GAP CONFIGURATION

(71) Applicant: QUALCOMM Incorporated, San Diego, CA (US)

(72) Inventors: Naeem Akl, Somerville, NJ (US); Navid Abedini, Basking Ridge, NJ (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 754 days.

(21) Appl. No.: 17/804,747

(22) Filed: May 31, 2022

(65) Prior Publication Data

US 2023/0388825 A1 Nov. 30, 2023

(51) Int. Cl.
*H04W 24/08* (2009.01)
*H04W 16/26* (2009.01)
*H04W 72/542* (2023.01)

(52) U.S. Cl.
CPC ......... *H04W 24/08* (2013.01); *H04W 72/542* (2023.01); *H04W 16/26* (2013.01)

(58) Field of Classification Search
CPC ... H04W 24/08; H04W 72/542; H04W 16/26; H04W 24/10; H04W 56/001; H04W 24/02; H04W 56/0045; H04W 48/16; H04W 16/18; H04W 84/047; H04W 88/04; H04L 5/0048; H04L 5/0091; H04L 41/145; H04L 43/00; H04B 7/15; H04B 7/2606
See application file for complete search history.

(56) References Cited

U.S. PATENT DOCUMENTS

| | | | | |
|---|---|---|---|---|
| 2008/0014863 A1* | 1/2008 | Van Buren | ......... | H04B 7/15564 |
| | | | | 455/7 |
| 2012/0263047 A1* | 10/2012 | Love | ..................... | H04L 1/0025 |
| | | | | 370/252 |
| 2020/0084798 A1* | 3/2020 | Peisa | ................. | H04W 74/0833 |
| 2020/0374735 A1* | 11/2020 | Wei | ......................... | H04L 5/0091 |
| 2020/0413356 A1* | 12/2020 | Wang | ................. | H04W 72/046 |
| 2021/0160711 A1* | 5/2021 | Chen | ................. | H04W 36/0088 |
| 2022/0022255 A1* | 1/2022 | He | ......................... | H04W 72/12 |
| 2022/0053486 A1 | 2/2022 | Abedini et al. | | |
| 2022/0061010 A1* | 2/2022 | Harada | ................. | H04W 48/16 |

(Continued)

FOREIGN PATENT DOCUMENTS

EP 3902339 A1 10/2021

OTHER PUBLICATIONS

International Search Report and Written Opinion—PCT/US2023/020588—ISA/EPO—Aug. 11, 2023.

*Primary Examiner* — Brian T Le
(74) *Attorney, Agent, or Firm* — Harrity & Harrity LLP/Qualcomm Incorporated

(57) ABSTRACT

Various aspects of the present disclosure generally relate to wireless communication. In some aspects, a repeater network node may obtain a measurement gap configuration that indicates a measurement gap to be used by the repeater network node for performing a measurement. The repeater network node may receive a downlink signal from a transmitter network node. The repeater network node may transmit the downlink signal, to a user equipment (UE), based at least in part on the downlink signal being received during the measurement gap. Numerous other aspects are described.

30 Claims, 11 Drawing Sheets

(56) References Cited

U.S. PATENT DOCUMENTS

| | | | |
|---|---|---|---|
| 2022/0174668 A1* | 6/2022 | Yuan | H04L 1/1812 |
| 2023/0170962 A1* | 6/2023 | Ali | H04B 7/0626 |
| | | | 370/252 |
| 2023/0353227 A1* | 11/2023 | Novlan | H04B 7/155 |
| 2024/0147288 A1* | 5/2024 | Huang | H04L 5/0092 |

* cited by examiner

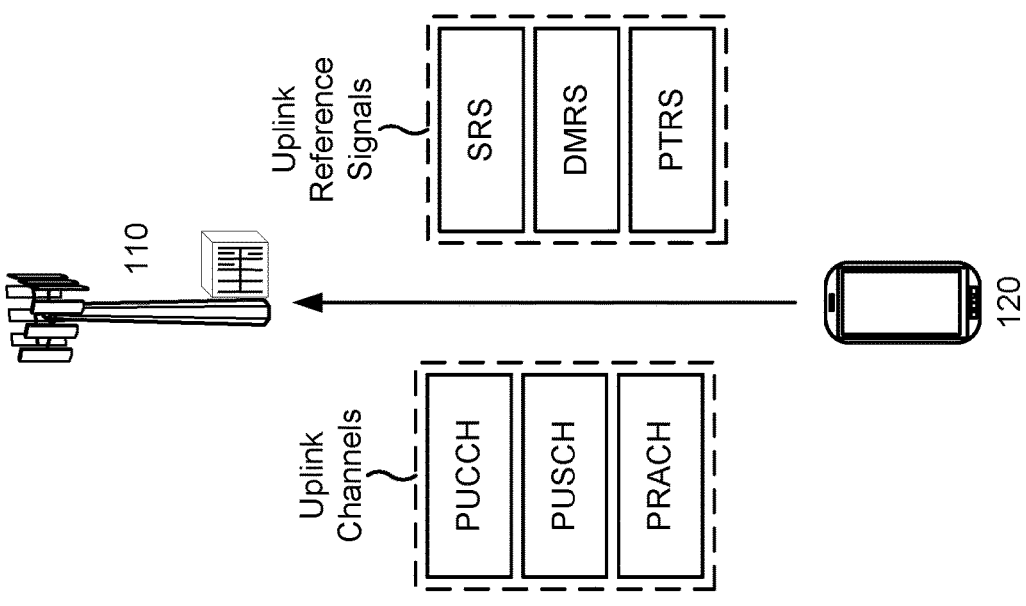
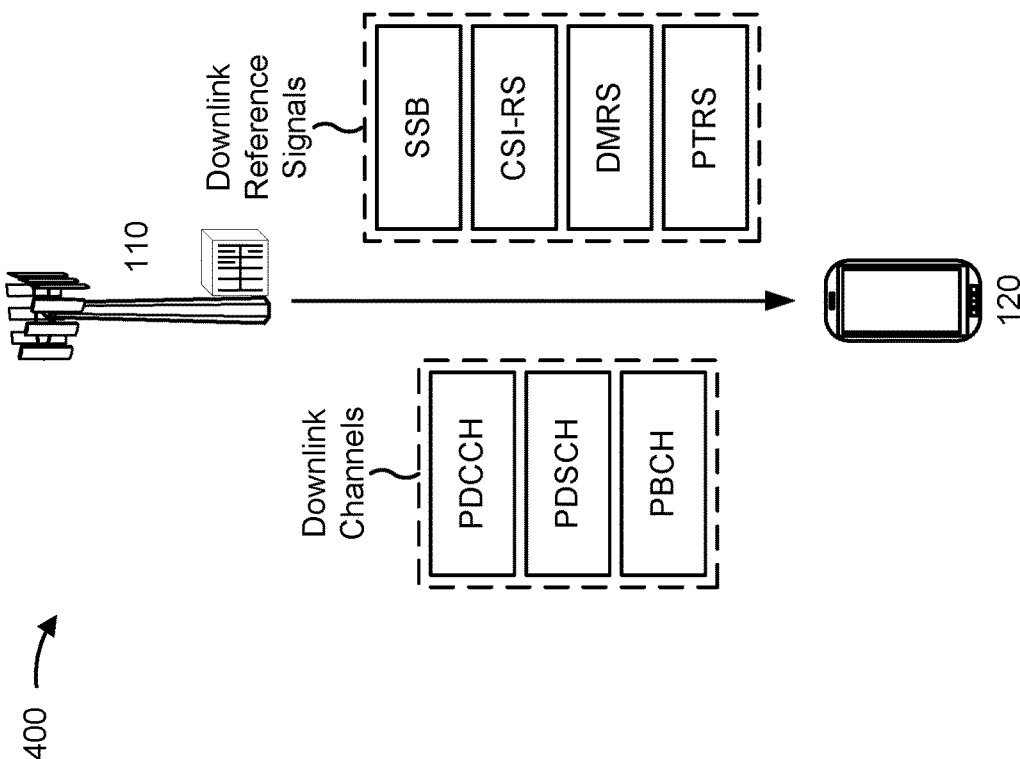
FIG. 4

800

810   Obtain a measurement gap configuration that indicates a measurement gap to be used by the repeater network node for performing a measurement 820   Receive a downlink signal from a transmitter network node 830   Transmit the downlink signal, to a user equipment (UE), based at least in part on the downlink signal being received during the measurement gap

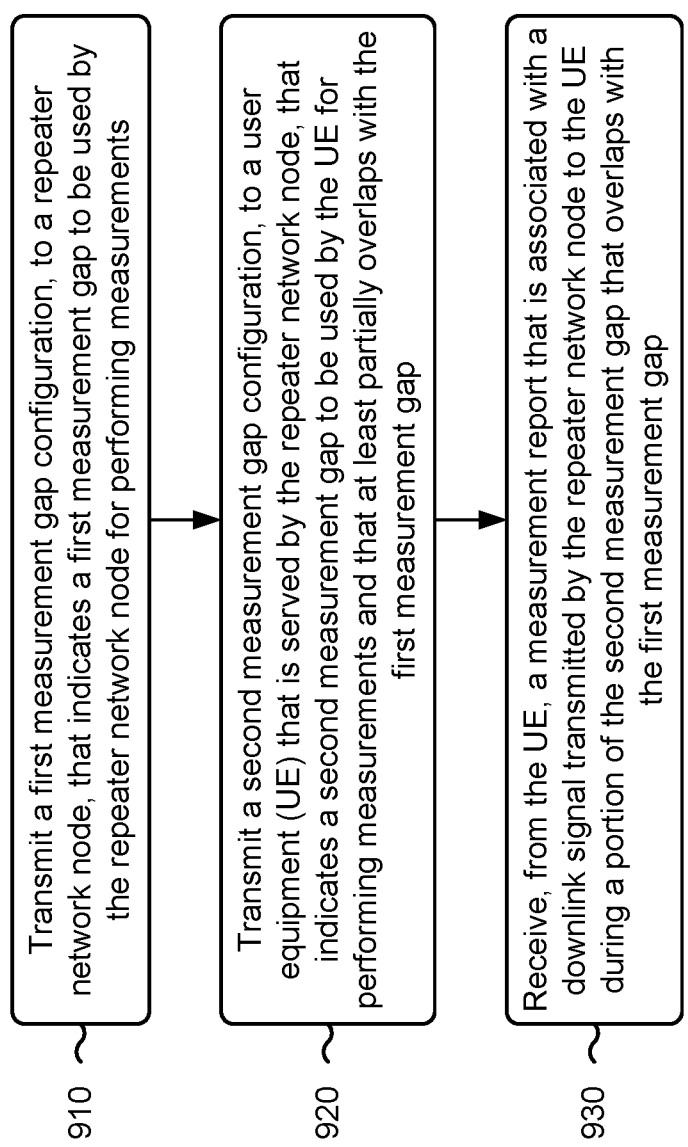

900

910 Transmit a first measurement gap configuration, to a repeater network node, that indicates a first measurement gap to be used by the repeater network node for performing measurements 920 Transmit a second measurement gap configuration, to a user equipment (UE) that is served by the repeater network node, that indicates a second measurement gap to be used by the UE for performing measurements and that at least partially overlaps with the first measurement gap 930 Receive, from the UE, a measurement report that is associated with a downlink signal transmitted by the repeater network node to the UE during a portion of the second measurement gap that overlaps with the first measurement gap

FIG. 9

REPEATER MEASUREMENT GAP CONFIGURATION

FIELD OF THE DISCLOSURE

Aspects of the present disclosure generally relate to wireless communication and to techniques and apparatuses for a repeater measurement gap configuration.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LIE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a repeater network node. The method may include obtaining a measurement gap configuration that indicates a measurement gap to be used by the repeater network node for performing a measurement. The method may include receiving a downlink signal from a transmitter network node. The method may include transmitting the downlink signal, to a user equipment (UE), based at least in part on the downlink signal being received during the measurement gap.

Some aspects described herein relate to a method of wireless communication performed by a transmitter network node. The method may include transmitting a first measurement gap configuration, to a repeater network node, that indicates a first measurement gap to be used by the repeater network node for performing measurements. The method may include transmitting a second measurement gap configuration, to a user equipment (UE) that is served by the repeater network node, that indicates a second measurement gap to be used by the UE for performing measurements and that at least partially overlaps with the first measurement gap. The method may include receiving, from the UE, a measurement report that is associated with a downlink signal transmitted by the repeater network node to the UE during a portion of the second measurement gap that overlaps with the first measurement gap.

Some aspects described herein relate to an apparatus for wireless communication performed by a repeater network node. The apparatus may include a memory and one or more processors, coupled to the memory. The one or more processors may be configured to obtain a measurement gap configuration that indicates a measurement gap to be used by the repeater network node for performing a measurement. The one or more processors may be configured to receive a downlink signal from a transmitter network node. The one or more processors may be configured to transmitting the downlink signal, to a UE, based at least in part on the downlink signal being received during the measurement gap.

Some aspects described herein relate to an apparatus for wireless communication performed by a transmitter network node. The apparatus may include a memory and one or more processors, coupled to the memory. The one or more processors may be configured to transmit a first measurement gap configuration, to a repeater network node, that indicates a first measurement gap to be used by the repeater network node for performing measurements. The one or more processors may be configured to transmit a second measurement gap configuration, to a user equipment (UE) that is served by the repeater network node, that indicates a second measurement gap to be used by the UE for performing measurements and that at least partially overlaps with the first measurement gap. The one or more processors may be configured to receive, from the UE, a measurement report that is associated with a downlink signal transmitted by the repeater network node to the UE during a portion of the second measurement gap that overlaps with the first measurement gap.

Some aspects described herein relate to a non-transitory computer-readable medium that stores a set of instructions for wireless communication by a repeater network node. The set of instructions, when executed by one or more processors of the repeater network node, may cause the repeater network node to obtain a measurement gap configuration that indicates a measurement gap to be used by the repeater network node for performing a measurement. The set of instructions, when executed by one or more processors of the repeater network node, may cause the repeater network node to receive a downlink signal from a transmitter network node. The set of instructions, when executed by one or more processors of the repeater network node, may cause the repeater network node to transmit the downlink signal, to a UE, based at least in part on the downlink signal being received during the measurement gap.

Some aspects described herein relate to a non-transitory computer-readable medium that stores a set of instructions for wireless communication by a transmitter network node. The set of instructions, when executed by one or more processors of the transmitter network node, may cause the transmitter network node to transmit a first measurement gap configuration, to a repeater network node, that indicates a first measurement gap to be used by the repeater network node for performing measurements. The set of instructions, when executed by one or more processors of the transmitter network node, may cause the transmitter network node to transmit a second measurement gap configuration, to a user equipment (UE) that is served by the repeater network node, that indicates a second measurement gap to be used by the UE for performing measurements and that at least partially overlaps with the first measurement gap. The set of instructions, when executed by one or more processors of the transmitter network node, may cause the transmitter network node to receive, from the UE, a measurement report that is associated with a downlink signal transmitted by the repeater network node to the UE during a portion of the second measurement gap that overlaps with the first measurement gap.

Some aspects described herein relate to an apparatus for wireless communication. The apparatus may include means for obtaining a measurement gap configuration that indicates a measurement gap to be used by a repeater network node for performing a measurement. The apparatus may include means for receiving a downlink signal from a transmitter network node. The apparatus may include means for transmitting the downlink signal, to a UE, based at least in part on the downlink signal being received during the measurement gap.

Some aspects described herein relate to an apparatus for wireless communication. The apparatus may include means for transmitting a first measurement gap configuration, to a repeater network node, that indicates a first measurement gap to be used by the repeater network node for performing measurements. The apparatus may include means for transmitting a second measurement gap configuration, to a user equipment (UE) that is served by the repeater network node, that indicates a second measurement gap to be used by the UE for performing measurements and that at least partially overlaps with the first measurement gap. The apparatus may include means for receiving, from the UE, a measurement report that is associated with a downlink signal transmitted by the repeater network node to the UE during a portion of the second measurement gap that overlaps with the first measurement gap.

Aspects generally include a method, apparatus, system, computer program product, non-transitory computer-readable medium, user equipment, base station, network entity, network node, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 4 is a diagram illustrating an example of physical channels and reference signals in a wireless network, in accordance with the present disclosure.

FIG. 9 is a diagram illustrating an example process performed, for example, by a transmitter network node, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
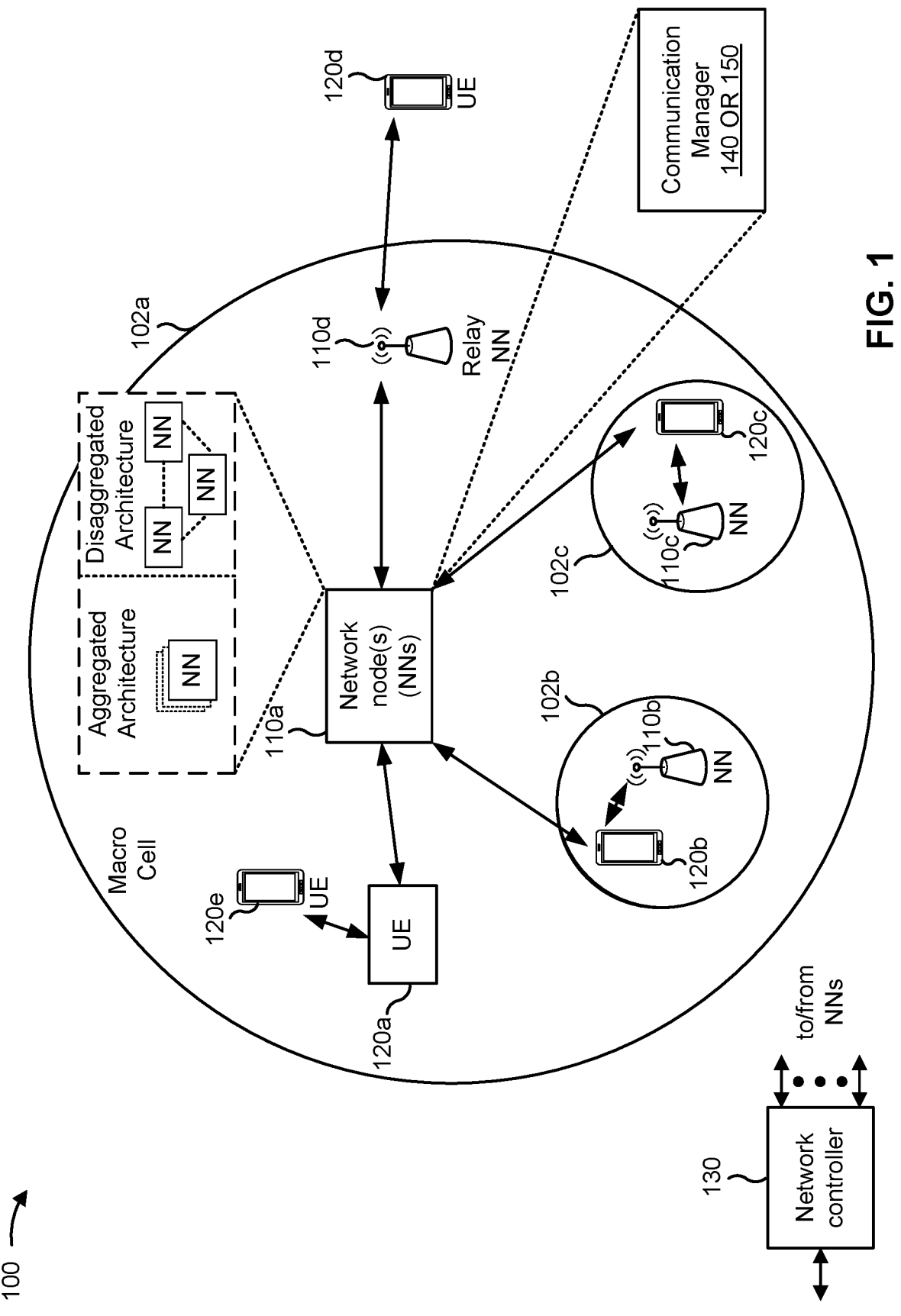
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LIE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the network node 110 (e.g., a repeater network node) may include a communication manager 140. As described in more detail elsewhere herein, the communication manager 140 may obtain a measurement gap configuration that indicates a measurement gap to be used by the repeater network node for performing a measurement; receive a downlink signal from a transmitter network node; and transmit the downlink signal, to a user equipment (UE), based at least in part on the downlink signal being received during the measurement gap. The downlink signal can include either a digital or an analog downlink signal. Additionally, or alternatively, the communication manager 140 may perform one or more other operations described herein.

In some aspects, the network node 110 (e.g., a transmitter network node) may include a communication manager 150. As described in more detail elsewhere herein, the communication manager 150 may transmit a first measurement gap configuration, to a repeater network node, that indicates a first measurement gap to be used by the repeater network node for performing measurements; transmitting a second measurement gap configuration, to a user equipment (UE) that is served by the repeater network node, that indicates a second measurement gap to be used by the UE for performing measurements and that at least partially overlaps with the first measurement gap; and receiving, from the UE, a measurement report that is associated with a downlink signal transmitted by the repeater network node to the UE during a portion of the second measurement gap that overlaps with the first measurement gap. The downlink signal can include either a digital or an analog downlink signal. Additionally, or alternatively, the communication manager 150 may perform one or more other operations described herein.

As indicated above, FIG. 1 is provided as an example. Other examples may differ from what is described with regard to FIG. 1.

Figure 2:
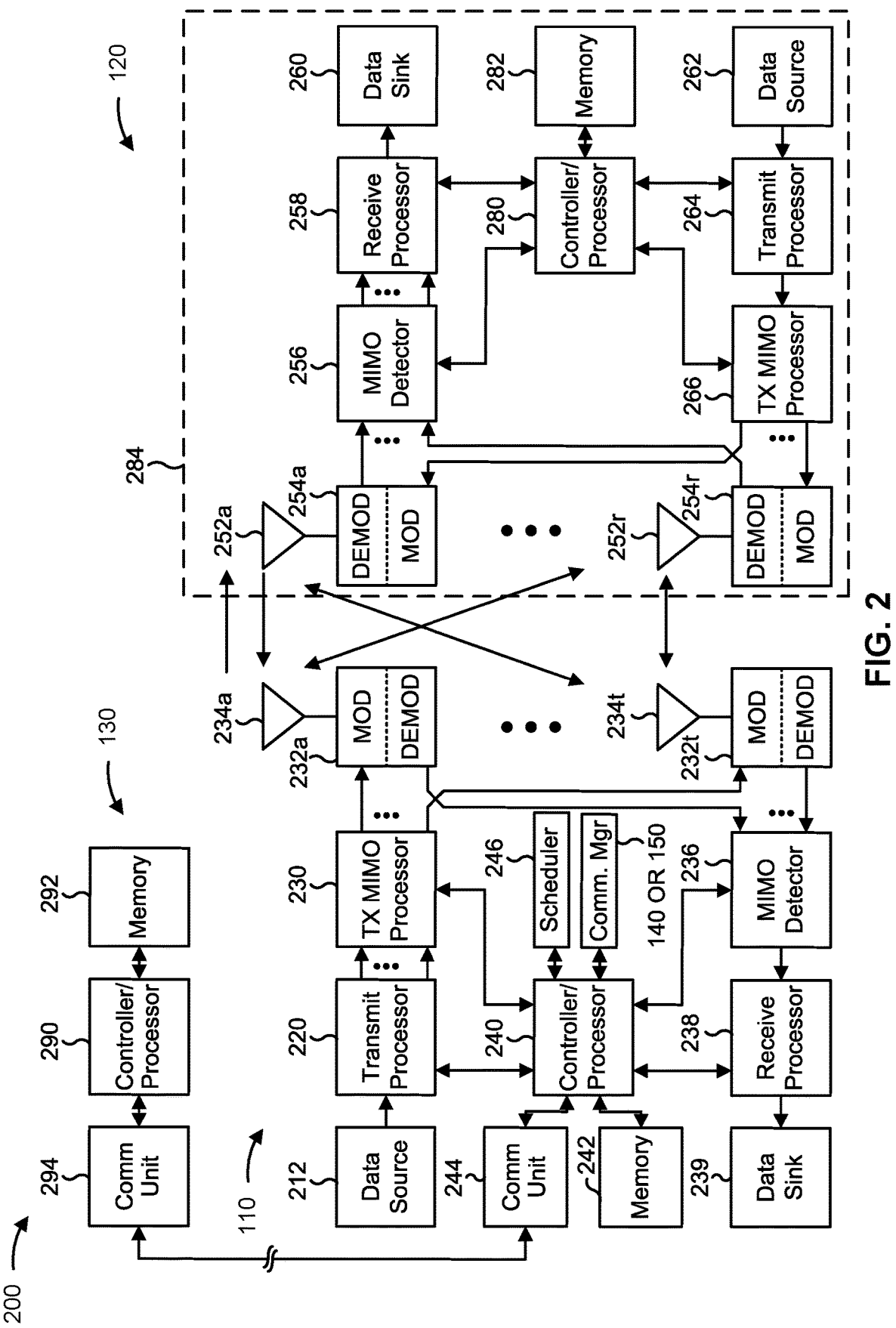
FIG. 2 is a diagram illustrating an example of a network node in communication with a user equipment (UE) in a wireless network, in accordance with the present disclosure.

FIG. 2 is a diagram illustrating an example 200 of a network node 110 in communication with a user equipment (UE) 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-11).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-11).

The controller/processor 240 of the network node 110, the controller/processor 280 of the UE 120, and/or any other component(s) of FIG. 2 may perform one or more techniques associated with a repeater measurement gap configuration, as described in more detail elsewhere herein. For example, the controller/processor 240 of the network node 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, the network node 110 (e.g., the repeater network node) includes means for obtaining a measurement gap configuration that indicates a measurement gap to be used by the repeater network node for performing a measurement (e.g., using antenna 234, modem 232, MIMO detector 236, receive processor 238, controller/processor 240, memory 242, or the like); means for receiving a downlink signal from a transmitter network node (e.g., using antenna 234, modem 232, MIMO detector 236, receive processor 238, controller/processor 240, memory 242, or the like); and/or means for transmitting the downlink signal, to a UE, based at least in part on the downlink signal being received during the measurement gap (e.g., using controller/processor 240, transmit processor 220, TX MIMO processor 230, modem 232, antenna 234, memory 242, or the like). In some aspects, the means for the repeater network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the network node 110 described above can receive a measurement gap configuration from another network node having similar components to network node 110, although such a network node having similar hardware components may have similar or different functionality. In one example, a network node similar to network node 110 may terminate a Uu interface for network node 110 and configures network node 110 with measurement gaps. Such a similar network node (e.g., the transmitter network node) includes means for transmitting a first measurement gap configuration, to a repeater network node, that indicates a first measurement gap to be used by the repeater network node for performing measurements (e.g., using controller/processor 240, transmit processor 220, TX MIMO processor 230, modem 232, antenna 234, memory 242, or the like); means for transmitting a second measurement gap configuration, to a user equipment (UE) that is served by the repeater network node, that indicates a second measurement gap to be used by the UE for performing measurements and that at least partially overlaps with the first measurement gap (e.g., using controller/processor 240, transmit processor 220, TX MIMO processor 230, modem 232, antenna 234, memory 242, or the like); and/or means for receiving, from the UE, a measurement report that is associated with a downlink signal transmitted by the repeater network node to the UE during a portion of the second measurement gap that overlaps with the first measurement gap (e.g., using antenna 234, modem 232, MIMO detector 236, receive processor 238, controller/processor 240, memory 242, or the like). In some aspects, the means for the transmitter network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
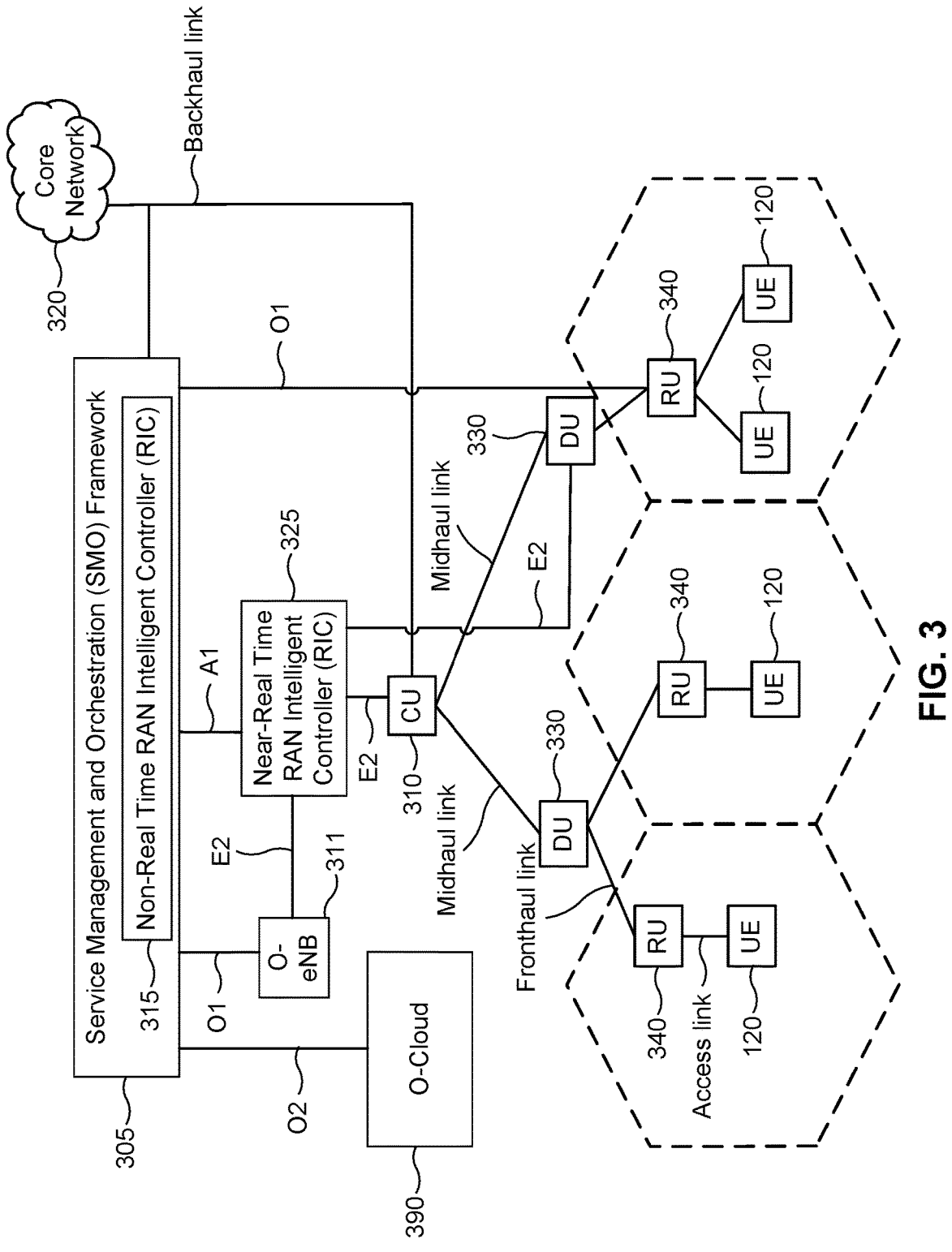
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the non-RT RIC 315 or the Near-RT RIC 325 may be configured to tune RAN behavior or performance. For example, the non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

FIG. 4 is a diagram illustrating an example 400 of physical channels and reference signals in a wireless network, in accordance with the present disclosure. As shown in FIG. 4, downlink channels and downlink reference signals may carry information from the network node 110 to the UE 120, and uplink channels and uplink reference signals may carry information from the UE 120 to the network node 110.

As shown, a downlink channel may include a physical downlink control channel (PDCCH) that carries downlink control information (DCI), a physical downlink shared channel (PDSCH) that carries downlink data, or a physical broadcast channel (PBCH) that carries system information, among other examples. In some aspects, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a physical random access channel (PRACH) used for initial network access, among other examples. In some aspects, the UE 120 may transmit acknowledgement (ACK) or negative acknowledgement (NACK) feedback (e.g., ACK/NACK feedback or ACK/NACK information) in UCI on the PUCCH and/or the PUSCH.

As further shown, a downlink reference signal may include a synchronization signal block (SSB), a channel state information (CSI) reference signal (CSI-RS), a demodulation reference signal (DMRS), a positioning reference signal (PRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a primary synchronization signal (PSS), a secondary synchronization signal (SSS), a PBCH, and a PBCH DMRS. An SSB is sometimes referred to as a synchronization signal/PBCH (SS/PBCH) block. In some aspects, the network node 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The network node 110 may configure a set of CSI-RSs for the UE 120, and the UE 120 may measure the configured set of CSI-RSs. Based at least in part on the measurements, the UE 120 may perform channel estimation and may report channel estimation parameters to the network node 110 (e.g., in a CSI report), such as a channel quality indicator (CQI), a precoding matrix indicator (PMI), a CSI-RS resource indicator (CRI), a layer indicator (LI), a rank indicator (RI), or a reference signal received power (RSRP), among other examples. The network node 110 may use the CSI report to select transmission parameters for downlink communications to the UE 120, such as a number of transmission layers (e.g., a rank), a precoding matrix (e.g., a precoder), a modulation and coding scheme (MCS), or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A PRS may carry information used to enable timing or ranging measurements of the UE 120 based on signals transmitted by the network node 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring network nodes in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. In some aspects, the network node 110 may then calculate a position of the UE 120 based on the RSTD measurements reported by the UE 120.

An SRS may carry information used for uplink channel estimation, which may be used for scheduling, link adaptation, precoder selection, or beam management, among other examples. The network node 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The network node 110 may measure the SRSs, may perform channel estimation based at least in part on the measurements, and may use the SRS measurements to configure communications with the UE 120.

In some cases, the network node 110 or the UE 120 may perform one or more measurements, based at least in part on a reference signal, during a measurement gap. The measurement gap may correspond to a period of time during which the network node 110 or the UE 120 can perform measurements based at least in part on one or more reference signals. As described herein, a measurement gap of the network node 110 may overlap (or partially overlap) with a measurement gap of the UE 120.

As indicated above, FIG. 4 is provided as an example. Other examples may differ from what is described with regard to FIG. 4.

Figure 5:
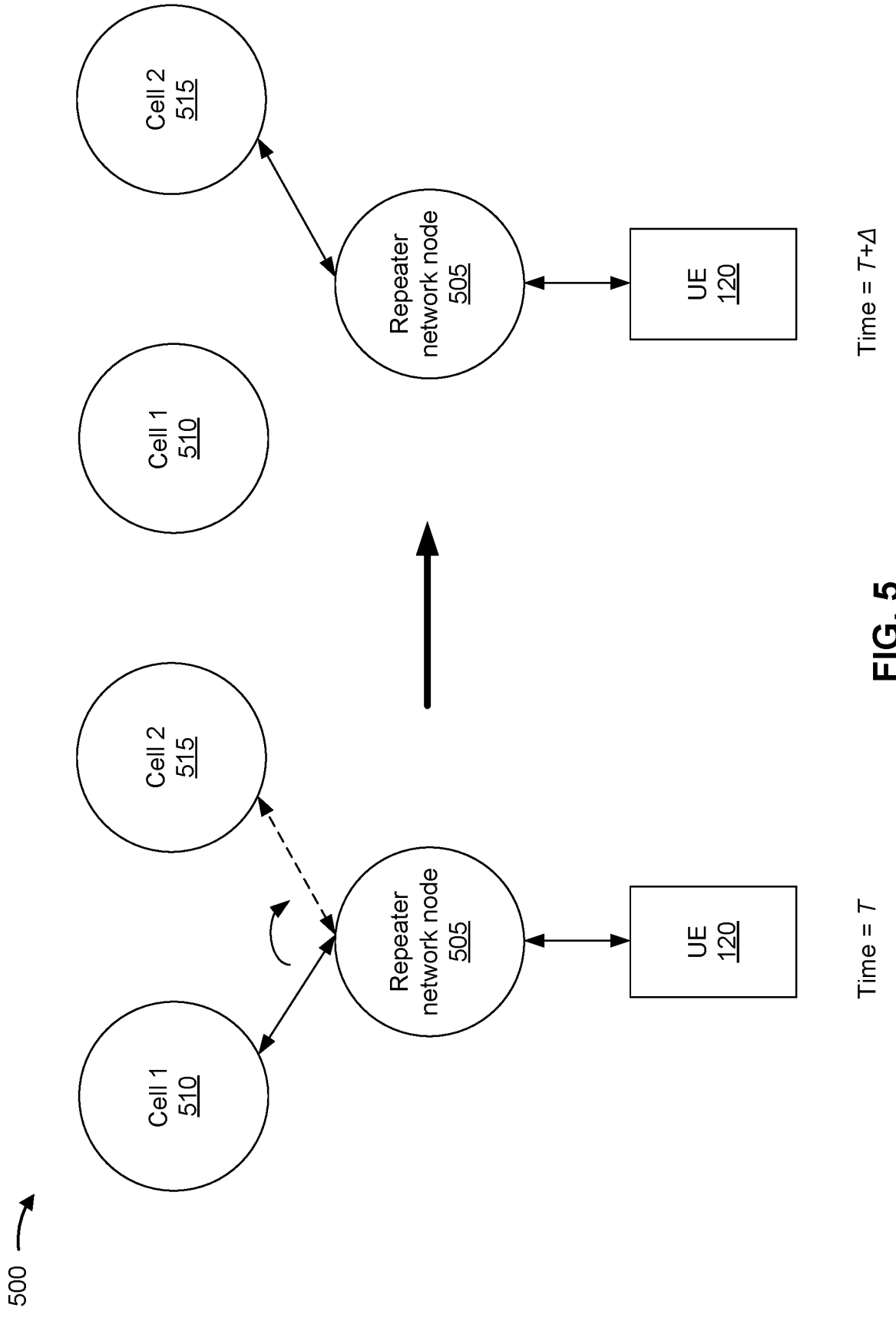
FIG. 5 is a diagram illustrating an example of a handover performed by a repeater network node, in accordance with the present disclosure.

FIG. 5 is a diagram illustrating an example 500 of a handover performed by a repeater network node, in accordance with the present disclosure. A repeater network node 505 may communicate with a first cell 510 (cell 1) and a second cell 515 (cell 2). The repeater network node 505, the first cell 510, and/or the second cell 515 may include some or all of the features of the CU 310, the DU 330, and/or the RU 340 described herein.

In some cases, the UE 120 may communicate with the first cell 510 and/or the second cell 515 via the repeater network node 505. For example, the repeater network node 505 may receive information from the first cell 510 and/or the second cell 515 and may transmit (e.g., forward or relay) the information to the UE 120. Additionally, or alternatively, the repeater network node 505 may receive information from the UE 120 and may transmit the information to the first cell 510 and/or the second cell 515. In some cases, the information may be a communication or may include a communication. For example, the repeater network node 505 may have an existing connection to the first cell 510 and may transmit a communication to the first cell 510 and/or receive a communication from the first cell 510. In some cases, the information may be a reference signal, or may include a reference signal, such as one or more of the reference signals described herein. For example, the repeater network node 505 may receive one or more reference signals from the first cell 510 and/or the second cell 515 regardless of whether or not the repeater network node 505 has an existing connection to the first cell 510 or the second cell 515.

In some cases, the repeater network node 505 may perform a handover from the first cell 510 to the second cell 515. For example, the repeater network node 505 may be in a coverage area of the first cell 510, and may be connected to the first cell 510 at a time T. The repeater network node 505 may move from the coverage area of the first cell 510 to a coverage area of the second cell 515. The repeater network node 505 may perform a handover from the first cell 510 to the second cell 515, and may be connected to the second cell 515 at a time T+Δ. However, after performing the handover from the first cell 510 to the second cell 515, the repeater network node 505 may no longer transmit the information between the first cell 510 and the UE 120. This may cause the UE 120 to become disconnected from the first cell 510, and in some cases, may cause the UE 120 to enter a radio link failure (RLF) state.

In some cases, the UE 120 may receive a measurement configuration that indicates a measurement gap for the UE 120 to perform measurements (e.g., reference signal measurements). Additionally, the repeater network node 505 may receive a measurement configuration that indicates a measurement gap for the repeater network node 505 to perform measurements. The measurement gap of the UE 120 may not be aligned with the measurement gap of the repeater network node 505. In some cases, the repeater network node 505 may forward signaling information to the UE 120, based on an instruction from the first cell 510, during a time that is within the measurement gap of the UE 120 but that is outside of the measurement gap of the repeater network node 505. The UE 120 may use the signaling information received from the first cell 510 (via the repeater network node 505) for performing beam adjustment and reference signal measurement within the measurement gap of the UE 120. However, since the measurement gap of the UE 120 is not aligned with the measurement gap of the repeater network node 505, the measurements performed by the UE 120 may not be the same as the measurements performed by the repeater network node 505. This may cause the repeater network node 505 to perform beam adjustments (e.g., based on an instruction from the first cell 510) that are not aligned with the conditions at the repeater network node 505. For example, the repeater network node 505 may perform erroneous beam adjustments that result in the repeater network node 505 receiving noise or receiving signaling from another cell. In this case, the repeater network node 505 and the UE 120 may not be able to accurately perform the handover from the first cell 510 to the second cell 515.

Techniques and apparatuses are described herein for a repeater measurement gap configuration. In some aspects, a repeater network node may obtain a measurement gap configuration that indicates a measurement gap to be used by the repeater network node for performing a measurement, such as a reference signal measurement. The repeater network node may receive a downlink signal from a transmitter network node. The repeater network node may transmit (e.g., forward or relay) the downlink signal to a UE based at least in part on the downlink signal being received during the measurement gap. In some aspects, the measurement gap configuration may be an SSB measurement transmission configuration that indicates a measurement window that is within the measurement gap, and the downlink signal may be an SSB signal. In this case, the repeater network node 505 may transmit the SSB signal based at least in part on the SSB signal being received within the measurement window.

As described above, a measurement gap of a repeater network node may not be aligned with a measurement gap of a UE. The repeater network node may forward signaling information to the UE, based on an instruction from a cell (e.g., a transmitter network node), during a time that is within the measurement gap of the UE but that is outside of the measurement gap of the repeater network node. This may cause the repeater network node to perform beam adjustments (e.g., based on an instruction from the cell) that are not aligned with the conditions at the repeater network node. Using the techniques and apparatuses described herein, the repeater network node may receive a measurement gap configuration that includes a measurement gap that is aligned with a measurement gap of the UE. The repeater network node may transmit a downlink signal to the UE based at least in part on the downlink signal being received within the measurement gap of the repeater network node. The repeater network node and the UE may use the downlink signal for performing measurements within the respective measurement gaps. The measurement performed within the measurement gaps may be used, for example, for beam adjustments by the repeater network node and/or the UE, or for initiating a handover procedure, among other examples. In some cases, the measurement performed within the measurement gaps may be used by the repeater network node for mobility purposes, such as for cell mobility and beam mobility, and may be reported to the network via a measurement report.

As indicated above, FIG. 5 is provided as an example. Other examples may differ from what is described with regard to FIG. 5.

Figure 6:
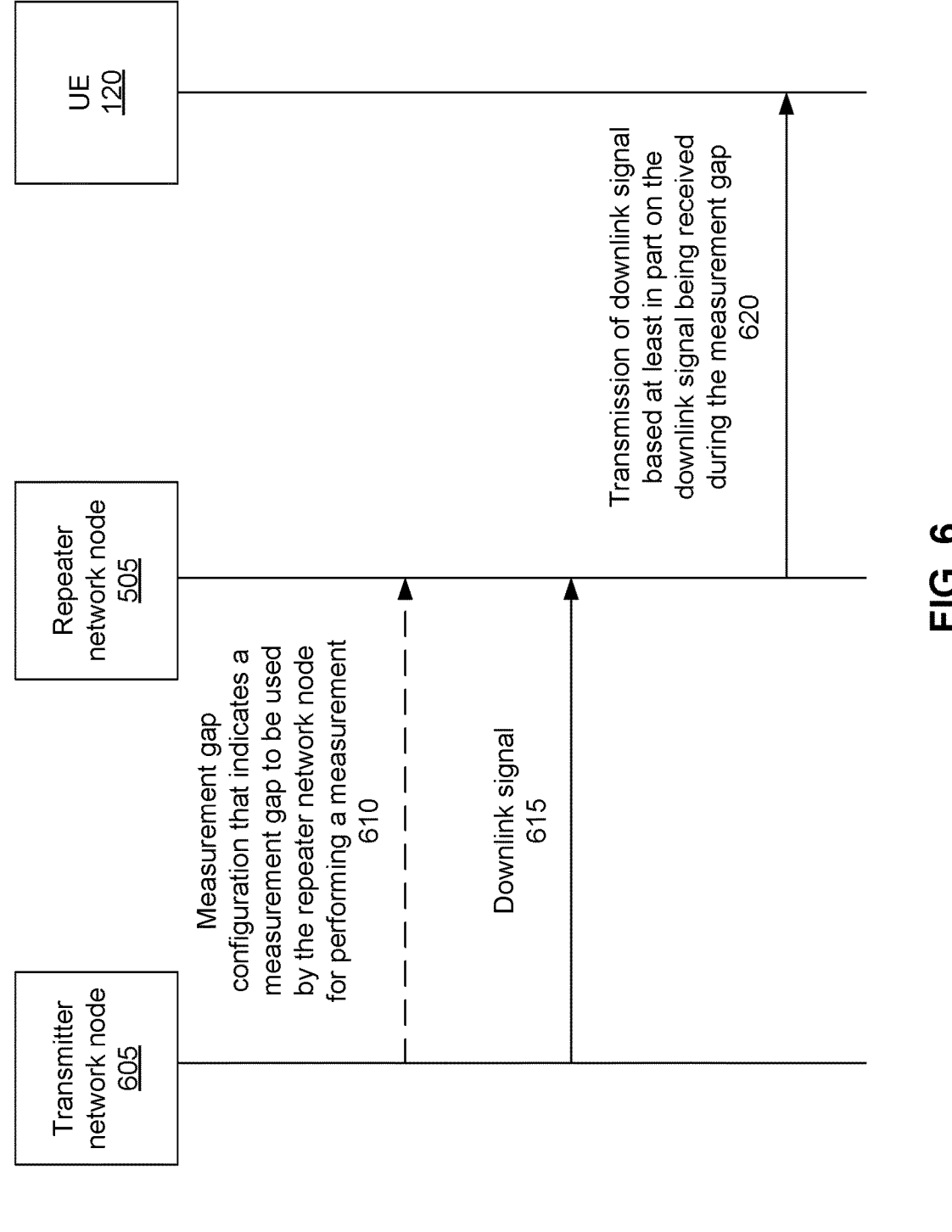
FIG. 6 is a diagram illustrating an example of a repeater measurement gap configuration, in accordance with the present disclosure.

FIG. 6 is a diagram illustrating an example 600 of a repeater measurement gap configuration, in accordance with the present disclosure. The repeater network node 505 may communicate with the UE 120 and with a transmitter network node 605. The transmitter network node 605 may include some or all of the features of the first cell 510, the second cell 515, the CU 310, the DU 330, and/or the RU 340.

As shown in connection with reference number 610, the repeater network node 505 may obtain a measurement gap configuration that indicates a measurement gap to be used by the repeater network node 505. In some aspects, the transmitter network node 605 may transmit, and the repeater network node 505 may receive, the measurement gap configuration. For example, the transmitter network node 605 may transmit an RRC message, a medium access control (MAC) message (such as a MAC control element (MAC-CE)), or DCI that includes the measurement gap configuration. In some aspects, the repeater network node 505 may receive the measurement gap configuration from another device, such as another transmitter network node. In some aspects, the repeater network node 505 may be configured (e.g., pre-configured) with the measurement gap configuration.

In some aspects, the measurement gap for the network node 110 may indicate a period of time during which the network node 110 can perform measurements based at least in part on one or more reference signals. For example, the network node 110 may perform the measurements for detecting a strength of a signal, measuring a channel quality, or performing a beam adjustment, among other examples. The measurement gap for the network node 110 may be a period of time during which the network node 110 is not transmitting or receiving other communications. In some aspects, the measurement gaps indicated in the measurement gap configuration may be periodic (e.g., may repeat according to an interval). In some aspects, the measurement gap configuration may indicate a measurement gap offset, a measurement gap repetition period (e.g., a measurement gap periodicity), and/or a measurement gap length (e.g., a duration of the measurement gap), among other examples. In some aspects, a system frame number (SFN) and/or a subframe of a reference cell (e.g., a serving cell) may be used to calculate the measurement gap. In some examples, the measurement gap configuration may apply to all measurements. In other examples, the measurement gap configuration may only apply to certain measurements, such as measurements associated with a frequency band. In some aspects, the measurement gap configuration may be a UE configuration. For example, the repeater network node 110 may have a UE functionality that enables the repeater network node 110 to receive side control information or to perform UE mobility procedures, among other examples, In some aspects, the measurement gap associated with the network node 110 may overlap (or partially overlap) with a measurement gap associated with the UE 120. In some aspects, the network node 110 and/or the UE 120 may be configured with multiple measurement gap configurations. In this case, a measurement gap of a select measurement gap configuration associated with the network node 110 may overlap (or partially overlap) with a measurement gap of a select measurement gap configuration associated with the UE 120. In some aspects, the measurement gap configuration may be an SSB measurement transmission configuration (SMTC) that indicates a measurement window within the measurement gap.

As shown in connection with reference number 615, the transmitter network node 605 may transmit, and the repeater network node 505 may receive, a downlink signal. In some aspects, the downlink signal may be a reference signal, such as an SSB, a CSI-RS, a DMRS, or a PTRS, among other examples. As described above, the measurement gap configuration may be an SMTC. In this case, the downlink signal may be an SSB signal.

As shown in connection with reference number 620, the repeater network node 505 may transmit, and the UE 120 may receive, the downlink signal based at least in part on the downlink signal being received during the measurement gap. For example, the repeater network node 505 may transmit the downlink signal to the UE 120 based at least in part on the downlink signal being received during the measurement gap. Alternatively, the repeater network node 505 may not transmit the downlink signal to the UE 120 based at least in part on the downlink signal being received outside of the measurement gap. In some aspects, the measurement gap configuration may be an SMTC that indicates a measurement window within the measurement gap, and the downlink signal may be an SSB signal. In this case, the repeater network node may transmit the SSB signal to the UE 120 based at least in part on the SSB signal being received during the measurement window.

In some aspects, transmitting the downlink signal may include forwarding or relaying the downlink signal from the transmitter network node 605 to the UE 120. In some aspects, the repeater network node 505 may amplify the downlink signal prior to transmitting the downlink signal. For example, the repeater network node 505 may generate an amplified downlink signal based at least in part on multiplying the downlink signal by an amplification factor. In this case, transmitting the downlink signal may include transmitting the amplified downlink signal. In some aspects, the repeater network node 505 may transmit the downlink signal to the UE 120 via an access interface associated with the repeater network node 505. Additional details regarding this feature are described in connection with FIG. 7.

In some aspects, the repeater network node 505 may receive an indication (e.g., an instruction) to transmit the downlink signal using a communication resource. The communication resource may overlap with the measurement gap. In this case, the repeater network node 505 may determine not to transmit the downlink signal. For example, the repeater network node 505 may discontinue transmitting downlink signals during the measurement gap (or measurement gaps) of the measurement gap configuration based at least in part on the communication resource overlapping with the measurement gap.

In some aspects, the repeater network node 505 may receive an indication to transmit the downlink signal using a communication resource. The communication resource may overlap with the measurement gap. In this case, the repeater network node 505 may prioritize the transmission of the downlink signal. For example, the repeater network node 505 may perform the transmission of the downlink signal during the measurement gap. Additionally, or alternatively, the repeater network node 505 may transmit the downlink signal prior to transmitting or receiving the other signals based at least in part on the communication resource overlapping with the measurement gap.

In some aspects, the repeater network node 505 may receive an indication of whether to transmit downlink signals within the measurement gap. For example, the indication may indicate one or more conditions for whether to transmit the downlink signals within the measurement gap. The indication of whether to transmit downlink signals within the measurement gap may be received from the transmitter network node 605. The repeater network node 505 may transmit the downlink signal based at least in part on the indication (as described below). In some aspects, receiving the indication may include receiving an RRC message, a MAC-CE, or DCI that includes the indication.

In some aspects, the indication may indicate the measurement gap configuration or multiple measurement gap configurations, such as all measurement gap configurations associated with the repeater network node 505. In this case, the repeater network node 505 may transmit the downlink signal based at least in part on the downlink signal being received by the repeater network node 505 in accordance with the measurement gap configuration or the multiple measurement gap configurations.

In some aspects, the indication may indicate one or more measurement gaps of a plurality of measurements gaps associated with the measurement gap configuration. In this case, the repeater network node 505 may transmit the downlink signal based at least in part on the downlink signal being received during the one or more measurement gaps of the plurality of measurement gaps associated with the measurement gap configuration.

In some aspects, the indication may indicate a frequency band (e.g., a frequency range or a frequency carrier). In this case, the repeater network node 505 may transmit the downlink signal based at least in part on determining an association between the measurement gap configuration and the frequency band. For example, the repeater network node 505 may transmit the downlink signal based at least in part on the measurement gap of the measurement gap configuration overlapping with the frequency band.

In some aspects, the repeater network node 505 may adapt (e.g., adjust) a bandwidth for transmitting the downlink signal based at least in part on whether the transmission of the downlink signal is to overlap with the measurement gap. For example, the repeater network node 505 may adapt a wider bandwidth for transmitting the downlink signal based at least in part on the determining that the downlink signal is to be transmitted during the measurement gap. In some aspects, the repeater network node 505 may adapt an access beam configuration of the repeater network node 505 based at least in part on whether the transmission of the downlink signal is to overlap with the measurement gap. For example, the repeater network node 505 may adapt a wider access beam configuration within the measurement gap bandwidth based at least in part on the determining that the downlink signal is to be transmitted during the measurement gap.

In some aspects, the repeater network node 505 may receive another measurement gap configuration (e.g., a second measurement gap configuration). The other measurement gap configuration may indicate another measurement gap. The other measurement gap may overlap with the measurement gap. In this case, the repeater network node 505 may adapt a bandwidth for transmitting the downlink signal based at least in part on whether the repeater network node 505 initiates the transmission of the downlink signal during the measurement gap or during the other measurement gap. For example, the repeater network node 505 may adapt a wider bandwidth based at least in part on the repeater network node 505 initiating the transmission of the downlink signal during the measurement gap or during the other measurement gap.

In some aspects, the repeater network node 505 may receive an indication of an access beam configuration or a fronthaul beam configuration for transmitting downlink signals within the measurement gap. In this case, the repeater network node 505 may transmit the downlink signal within the measurement gap based at least in part on the access beam configuration or the fronthaul beam configuration. In some aspects, the indication of the access beam configuration or the fronthaul beam configuration may include an indication of the measurement gap configuration, a plurality of measurement gap configurations, or one or more measurement gaps indicated by the measurement gap configuration. In some aspects, the indication of the access beam configuration or the fronthaul beam configuration may indicate one or more recommended beams and/or one or more restricted beams for the access beam or fronthaul beam transmissions. In some aspects, receiving the indication of the access beam configuration or the fronthaul beam configuration may include receiving an RRC message, a MAC-CE, or DCI that includes the access beam configuration or the fronthaul beam configuration.

In some aspects, the repeater network node 505 may receive another downlink signal in another measurement gap associated with another measurement gap configuration. The other downlink signal that is received in the other measurement gap may be received prior to the downlink signal that is received in the measurement gap. For example, the repeater network node 505 may receive the other downlink signal during the other measurement gap at a first time, and may receive the downlink signal during the measurement gap at a second time that is later than the first time. In some aspects, the repeater network node 505 may receive the other measurement gap configuration from the transmitter network node 605. For example, the repeater network node 505 may receive an RRC message, a MAC-CE, or DCI from the transmitter network node 605 that includes an indication of the other measurement gap configuration.

In some aspects, the repeater network node 505 may perform a measurement (or multiple measurements) associated with the other downlink signal, and may transmit the downlink signal in the measurement gap based at least in part the measurement of the other reference signal satisfying a measurement condition. For example, the repeater network node may transmit the downlink signal in the measurement gap based at least in part on the other reference signal satisfying the measurement condition, such as having a measurement that is above a measurement threshold in one or more directions. Alternatively, the repeater network node may not transmit the downlink signal in the measurement gap based at least in part on the other reference signal not satisfying the measurement condition, such as having a measurement that is not above the measurement threshold in one or more directions.

In some aspects, the repeater network node 505 may perform one or more measurements associated with the other downlink signal, and may transmit an indication of the one or more measurements to the transmitter network node 605. For example, the repeater network node 505 may transmit a measurement report that includes an indication of the one or more measurements. The transmitter network node 605 may receive the measurement report, and may determine whether the one or more measurements included in the measurement report satisfy one or more measurement conditions. The transmitter network node 605, based on the one or more measurements in the measurement report satisfying the one or more measurement conditions, may transmit an indication for the repeater network node 505 to transmit the downlink signal in the measurement gap. The repeater network node 505 may transmit the downlink signal in the measurement gap based at least in part on receiving the indication from the transmitter network node 605.

In some aspects, the repeater network node 505 may be an integrated access and backhaul (IAB) node. For example, the repeater network node 505 may be an IAB node and the transmitter network node 605 may be an IAB donor or a parent IAB node. The IAB node may be configured to relay information or data from the IAB donor to a UE such as the UE 120.

As described herein, in some cases, a measurement gap of the repeater network node 505 may not be aligned with a measurement gap of the UE 120. The repeater network node 505 may forward signaling information to the UE 120, based on an instruction from the transmitter network node 605, during a time that is within the measurement gap of the UE 120 but that is outside of the measurement gap of the repeater network node 505. This may cause the repeater network node 505 to perform beam adjustments that are not aligned with the conditions at the repeater network node 505. Using the techniques and apparatuses described herein, the repeater network node 505 may receive a measurement gap configuration that includes a measurement gap that is aligned with a measurement gap of the UE 120. The repeater network node 505 may transmit a downlink signal to the UE 120 based at least in part on the downlink signal being received within the measurement gap of the repeater network node 505. The repeater network node 505 and the UE 120 may use the downlink signal for performing measurements within the respective measurement gaps. The measurement performed within the measurement gaps may be used, for example, for beam adjustments by the repeater network node 505 and/or the UE 120, or for initiating a handover procedure, among other examples.

As indicated above, FIG. 6 is provided as an example. Other examples may differ from what is described with regard to FIG. 6.

Figure 7:
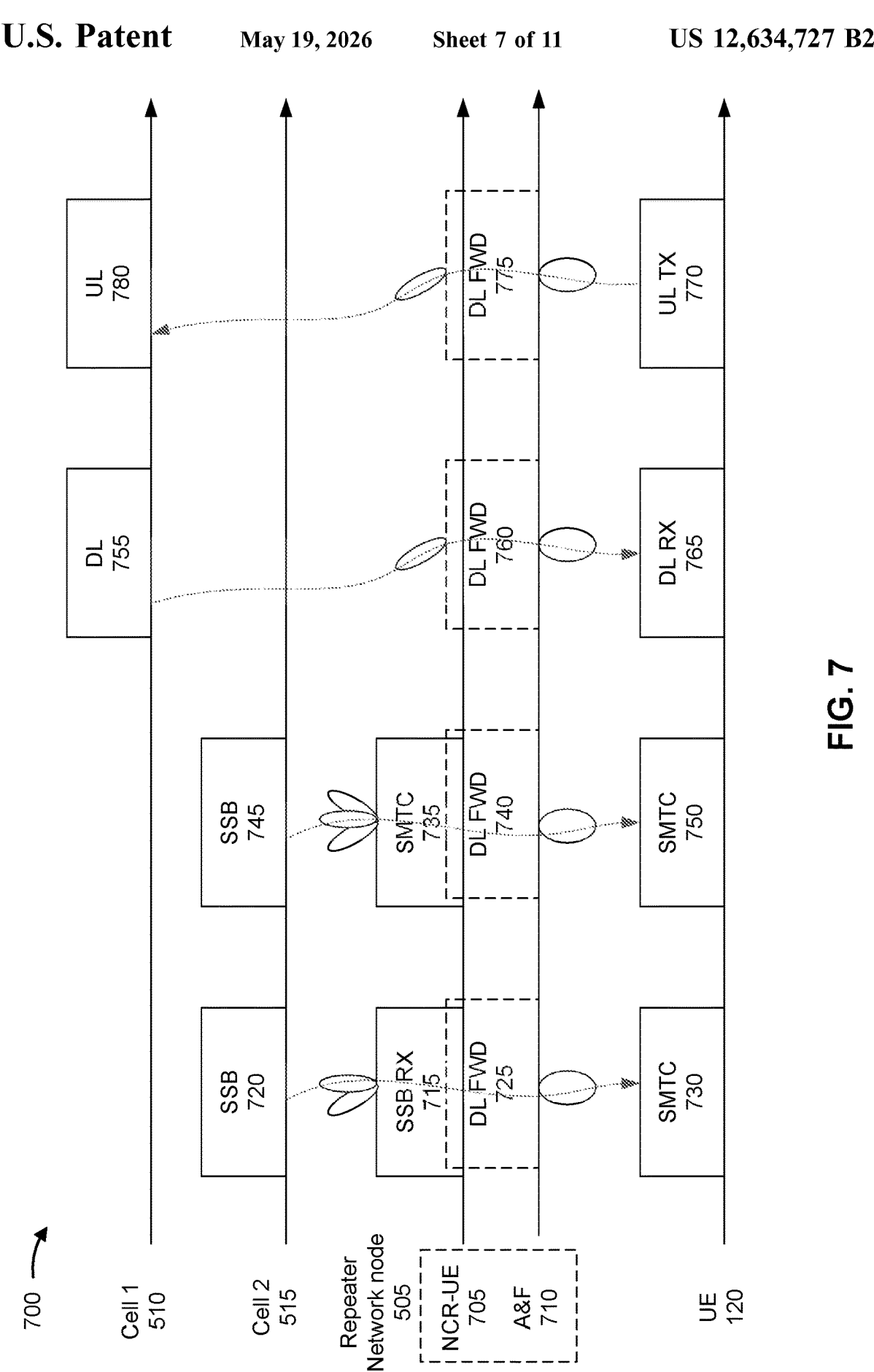
FIG. 7 is a diagram illustrating an example of a timing diagram for a measurement gap configuration, in accordance with the present disclosure.

FIG. 7 is a diagram illustrating an example 700 of a timing diagram for a measurement gap configuration, in accordance with the present disclosure. The repeater network node 505 may communicate with the first cell 510 and/or the second cell 515 via a network-controlled repeater (NCR) interface, such as the NCR-UE 705. The NCR-UE 705 may be used, for example, to receive control information, to perform beam management (e.g., on the fronthaul interface), to perform a mobility operation, or to perform other UE-related functionality, among other examples. The repeater network node 505 may communicate with the UE 120 via an amplify and forward (A&F) interface, such as the A&F 710. As shown by reference number 715, the repeater network node 505 may detect an SSB 720 from the second cell 515 using the NCR-UE 705. As shown by reference number 725, the repeater network node 505 may transmit an indication of the SSB to the UE 120 using the A&F 710. The indication of the SSB may be received by the UE 120 using an SMTC 730 of the UE 120. As shown by reference number 735, the repeater network node 505 may detect an SSB 745 from the second cell 515. As shown by reference number 740, the repeater network node 505 may transmit an indication of the SSB to the UE 120 using the A&F 710. The indication of the SSB may be received by the UE 120 using an SMTC 750 of the UE 120. In some aspects, the SMTC 730 and the SMTC 750 may correspond to different measurement windows associated with an SMTC of the UE 120. As shown, the SMTC associated with the repeater network node 505 may be aligned (e.g., may overlap in time) with the SMTC associated with the UE 120. As shown by reference number 760, the repeater network node 505 may receive a downlink (DL) signal 755 from the first cell 510 via the NCR-UE 705. As shown by reference number 765, the UE 120 may receive the DL signal from the repeater network node 505 via the A&F 710. The downlink signal may be, for example, data traffic or control traffic associated with a UE. As shown by reference number 775, the repeater network node 505 may receive an uplink (UL) signal 770 from the UE 120 via the A&F 710. As shown by reference number 780, the first cell 510 may receive an indication of the UL signal from the repeater network node 505 via the NCR-UE 705. In some aspects, the indication of the uplink signal may include a measurement that is based at least in part on the downlink signal, such as a measurement associated with an SSB signal.

As indicated above, FIG. 7 is provided as an example. Other examples may differ from what is described with regard to FIG. 7.

Figure 8:
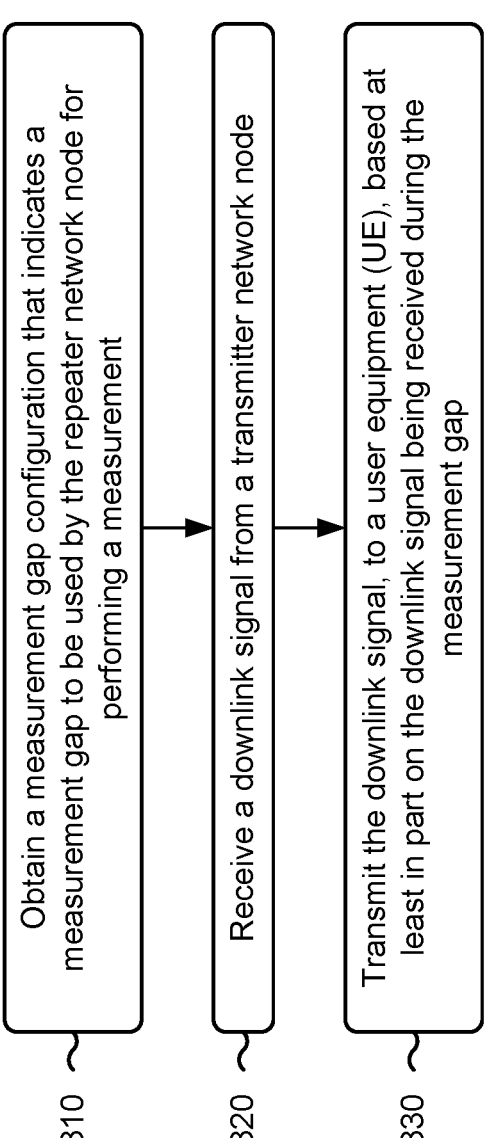
FIG. 8 is a diagram illustrating an example process performed, for example, by a repeater network node, in accordance with the present disclosure.

FIG. 8 is a diagram illustrating an example process 800 performed, for example, by a repeater network node, in accordance with the present disclosure. Example process 800 is an example where the repeater network node (e.g., repeater network node 505) performs operations associated with repeater measurement gap configuration.

As shown in FIG. 8, in some aspects, process 800 may include obtaining a measurement gap configuration that indicates a measurement gap to be used by the repeater network node for performing a measurement (block 810). For example, the repeater network node (e.g., using communication manager 140 and/or obtaining component 1008, depicted in FIG. 10) may obtain a measurement gap configuration that indicates a measurement gap to be used by the repeater network node for performing a measurement, as described above, for example, with reference to FIGS. 6 and/or 7.

As further shown in FIG. 8, in some aspects, process 800 may include receiving a downlink signal from a transmitter network node (block 820). For example, the repeater network node (e.g., using communication manager 140 and/or reception component 1002, depicted in FIG. 10) may receive a downlink signal from a transmitter network node, as described above, for example, with reference to FIGS. 6 and/or 7.

As further shown in FIG. 8, in some aspects, process 800 may include transmitting the downlink signal, to a UE, based at least in part on the downlink signal being received during the measurement gap (block 830). For example, the repeater network node (e.g., using communication manager 140 and/or transmission component 1004, depicted in FIG. 10) may transmit the downlink signal, to a UE, based at least in part on the downlink signal being received during the measurement gap, as described above, for example, with reference to FIGS. 6 and/or 7.

Process 800 may include additional aspects, such as any single aspect or any combination of aspects described below and/or in connection with one or more other processes described elsewhere herein.

In a first aspect, process 800 includes generating an amplified downlink signal based at least in part on applying an amplification factor to the downlink signal, wherein transmitting the downlink signal comprises transmitting the amplified downlink signal.

In a second aspect, alone or in combination with the first aspect, transmitting the downlink signal to the UE comprises transmitting the downlink signal to the UE via an access interface associated with the repeater network node.

In a third aspect, alone or in combination with one or more of the first and second aspects, the first measurement gap configuration is an SSB measurement transmission configuration (SMTC) that indicates a measurement window that is within the first measurement gap.

In a fourth aspect, alone or in combination with one or more of the first through third aspects, receiving the downlink signal comprises receiving an SSB signal, and wherein transmitting the downlink signal comprises transmitting the SSB signal based at least in part on the SSB signal being received during the measurement window.

In a fifth aspect, alone or in combination with one or more of the first through fourth aspects, process 800 includes receiving an indication to transmit the downlink signal using a communication resource that overlaps with the measurement gap, and determining not to perform a transmission of the downlink signal during the measurement gap.

In a sixth aspect, alone or in combination with one or more of the first through fifth aspects, process 800 includes receiving an indication to transmit the downlink signal using a communication resource that overlaps with the measurement gap, and prioritizing a transmission of the downlink signal during the measurement gap.

In a seventh aspect, alone or in combination with one or more of the first through sixth aspects, process 800 includes receiving an indication of one or more conditions for transmitting downlink signals during the measurement gap, wherein transmitting the downlink signal comprises transmitting the downlink signal in accordance with the one or more conditions.

In an eighth aspect, alone or in combination with one or more of the first through seventh aspects, the one or more conditions indicate that the downlink signal is to be transmitted using a select measurement gap configuration or a plurality of select measurement gap configurations, wherein transmitting the downlink signal comprises transmitting the downlink signal based at least in part on the measurement gap configuration being the select measurement gap configuration or being included in the plurality of select measurement gap configurations.

In a ninth aspect, alone or in combination with one or more of the first through eighth aspects, the one or more conditions indicate that the downlink signal is to be transmitted using a select measurement gap or a plurality of select measurement gaps of the measurement gap configuration, wherein transmitting the downlink signal comprises transmitting the downlink signal based at least in part on the measurement gap being the select measurement gap or being included in the plurality of select measurement gaps.

In a tenth aspect, alone or in combination with one or more of the first through ninth aspects, the one or more conditions indicate that the downlink signal is to be transmitted using a frequency band, and wherein transmitting the downlink signal comprises transmitting the downlink signal based at least in part on an association between the measurement gap configuration and the frequency band.

In an eleventh aspect, alone or in combination with one or more of the first through tenth aspects, receiving the indication of the one or more conditions comprises receiving a radio resource control message, a medium access control message, or downlink control information that includes the indication of the one or more conditions.

In a twelfth aspect, alone or in combination with one or more of the first through eleventh aspects, process 800 includes adapting a bandwidth for transmitting the downlink signal based at least in part on an indication that the downlink signal is to be transmitted during the measurement gap.

In a thirteenth aspect, alone or in combination with one or more of the first through twelfth aspects, process 800 includes obtaining another measurement gap configuration that indicates another measurement gap, wherein the other measurement gap overlaps with the measurement gap, and adapting a bandwidth for transmitting the downlink signal based at least in part on an indication that the downlink signal is to be transmitted during the measurement gap or during the other measurement gap.

In a fourteenth aspect, alone or in combination with one or more of the first through thirteenth aspects, process 800 includes adapting a beam configuration based at least in part on an indication that the downlink signal is to be transmitted during the measurement gap.

In a fifteenth aspect, alone or in combination with one or more of the first through fourteenth aspects, adapting the beam configuration comprises switching to a wider access beam for at least a portion of a duration of the measurement gap.

In a sixteenth aspect, alone or in combination with one or more of the first through fifteenth aspects, process 800 includes obtaining an indication of an access beam configuration or a fronthaul beam configuration for transmitting downlink signals during the measurement gap, wherein transmitting the downlink signal comprises transmitting the downlink signal in accordance with the access beam configuration or the fronthaul beam configuration.

In a seventeenth aspect, alone or in combination with one or more of the first through sixteenth aspects, the indication of the access beam configuration or the fronthaul beam configuration includes an indication of the measurement gap configuration, an indication of a plurality of measurement gap configurations that includes the measurement gap configuration, or an indication of a plurality of measurement gaps that includes the measurement gap.

In an eighteenth aspect, alone or in combination with one or more of the first through seventeenth aspects, the indication of the access beam configuration or the fronthaul beam configuration indicates one or more recommended beams or one or more restricted beams.

In a nineteenth aspect, alone or in combination with one or more of the first through eighteenth aspects, obtaining the indication of the access beam configuration or the fronthaul beam configuration comprises receiving a radio resource control message, a medium access control message, or downlink control information that includes the indication of the access beam configuration or the fronthaul beam configuration.

In a twentieth aspect, alone or in combination with one or more of the first through nineteenth aspects, process 800 includes receiving another downlink signal during another measurement gap associated with the measurement gap configuration, wherein receiving the other downlink signal during the other measurement gap comprises receiving the other downlink signal during the other measurement gap prior to receiving the downlink signal during the measurement gap, and wherein transmitting the downlink signal comprises transmitting the downlink signal based at least in part on a measurement condition associated with the other downlink signal.

In a twenty-first aspect, alone or in combination with one or more of the first through twentieth aspects, process 800 includes receiving an indication of the measurement condition from the transmitter network node.

In a twenty-second aspect, alone or in combination with one or more of the first through twenty-first aspects, process 800 includes receiving another downlink signal during another measurement gap associated with the measurement gap configuration, wherein receiving the other downlink signal during the other measurement gap comprises receiving the other downlink signal during the other measurement gap prior to receiving the downlink signal during the measurement gap, transmitting, to the transmitter network node, a measurement associated with the other downlink signal, and receiving, from the transmitter network node, an indication of whether to transmit the downlink signal based at least in part on the measurement associated with the other downlink signal.

In a twenty-third aspect, alone or in combination with one or more of the first through twenty-second aspects, the measurement gap configuration at least partially overlaps with a measurement gap configuration of the UE.

In a twenty-fourth aspect, alone or in combination with one or more of the first through twenty-third aspects, obtaining the measurement gap configuration comprises receiving the measurement gap configuration from the transmitter network node or another transmitter network node.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

FIG. 9 is a diagram illustrating an example process 900 performed, for example, by a transmitter network node, in accordance with the present disclosure. Example process 900 is an example where the transmitter network node (e.g., transmitter network node 605) performs operations associated with repeater measurement gap configuration.

As shown in FIG. 9, in some aspects, process 900 may include transmitting a first measurement gap configuration, to a repeater network node, that indicates a first measurement gap to be used by the repeater network node for performing measurements (block 910). For example, the transmitter network node (e.g., using communication manager 150 and/or transmission component 1104, depicted in FIG. 11) may transmit a first measurement gap configuration, to a repeater network node, that indicates a first measurement gap to be used by the repeater network node for performing measurements, as described above, for example, with reference to FIGS. 6 and/or 7.

As further shown in FIG. 9, in some aspects, process 900 may include transmitting a second measurement gap configuration, to a UE that is served by the repeater network node, that indicates a second measurement gap to be used by the UE for performing measurements and that at least partially overlaps with the first measurement gap (block 920). For example, the transmitter network node (e.g., using communication manager 150 and/or transmission component 1104, depicted in FIG. 11) may transmit a second measurement gap configuration, to a UE that is served by the repeater network node, that indicates a second measurement gap to be used by the UE for performing measurements and that at least partially overlaps with the first measurement gap, as described above, for example, with reference to FIGS. 6 and/or 7.

As further shown in FIG. 9, in some aspects, process 900 may include receiving, from the UE, a measurement report that is associated with a downlink signal transmitted by the repeater network node to the UE during a portion of the second measurement gap that overlaps with the first measurement gap (block 930). For example, the transmitter network node (e.g., using communication manager 150 and/or reception component 1102, depicted in FIG. 11) may receive, from the UE, a measurement report that is associated with a downlink signal transmitted by the repeater network node to the UE during a portion of the second measurement gap that overlaps with the first measurement gap, as described above, for example, with reference to FIGS. 6 and/or 7.

Process 900 may include additional aspects, such as any single aspect or any combination of aspects described below and/or in connection with one or more other processes described elsewhere herein.

In a first aspect, the first measurement gap configuration is an SSB measurement transmission configuration (SMTC) that indicates a measurement window that is within the first measurement gap.

In a second aspect, alone or in combination with the first aspect, process 900 includes transmitting an indication to forward the downlink signal using a communication resource that overlaps with the measurement gap.

In a third aspect, alone or in combination with one or more of the first and second aspects, process 900 includes transmitting an indication of one or more conditions for forwarding downlink signals during the measurement gap.

In a fourth aspect, alone or in combination with one or more of the first through third aspects, the one or more conditions indicate that the downlink signal is to be forwarded using a select measurement gap configuration or a plurality of select measurement gap configurations, that the downlink signal is to be forwarded using a select measurement gap or a plurality of select measurement gaps of the measurement gap configuration, or that downlink signal is to be forwarded using a particular frequency band.

In a fifth aspect, alone or in combination with one or more of the first through fourth aspects, process 900 includes transmitting an indication of an access beam configuration or a fronthaul beam configuration for forwarding downlink signals during the measurement gap.

In a sixth aspect, alone or in combination with one or more of the first through fifth aspects, the indication of the access beam configuration or the fronthaul beam configuration indicates one or more recommended beams or one or more restricted beams.

In a seventh aspect, alone or in combination with one or more of the first through sixth aspects, process 900 includes transmitting an indication to the repeater network node that instructs the repeater network node to transmit the downlink signal to the UE.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
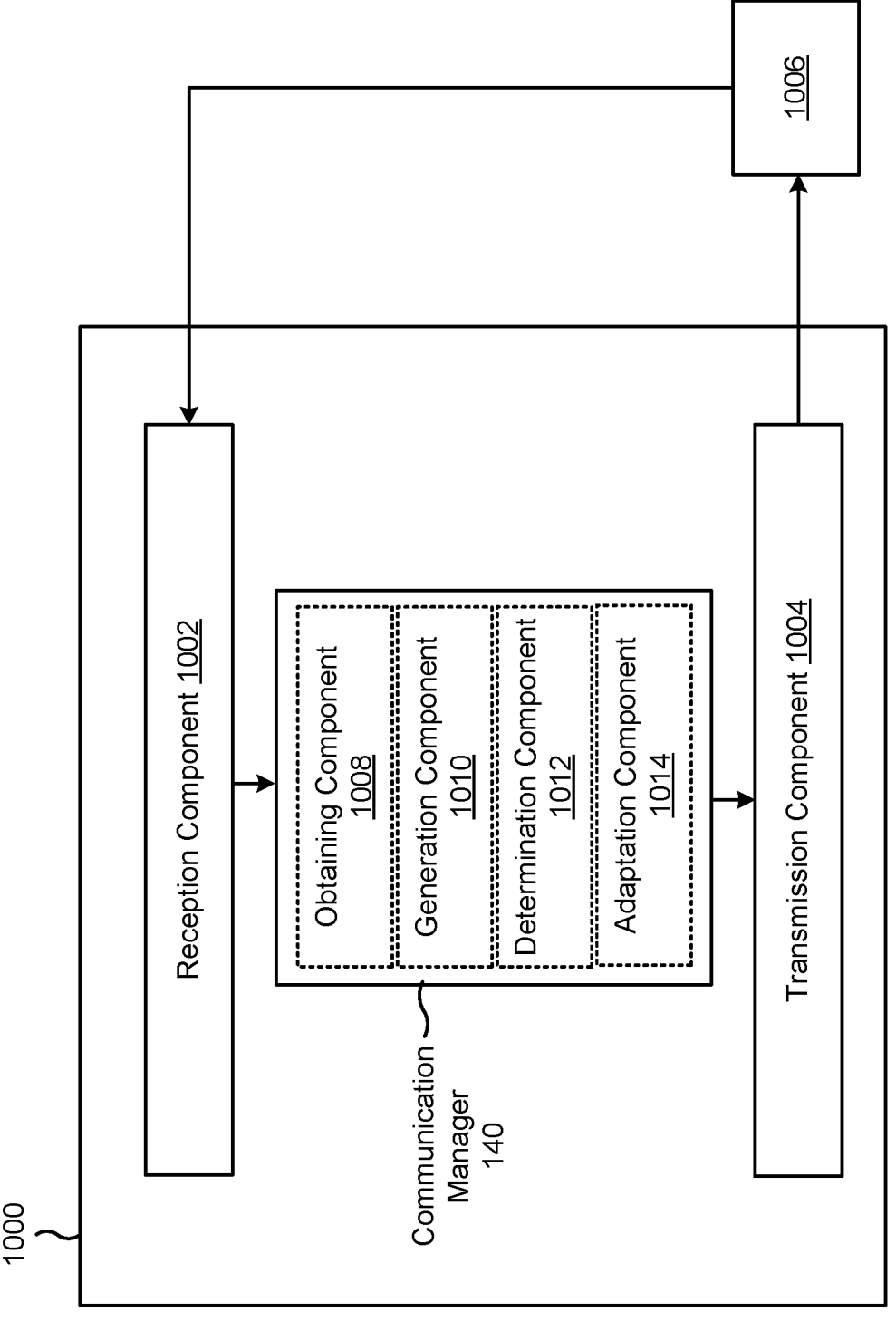
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a repeater network node, or a repeater network node may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 140. The communication manager 140 may include one or more of an obtaining component 1008, a generation component 1010, a determination component 1012, or an adaptation component 1014, among other examples.

In some aspects, the apparatus 1000 may be configured to perform one or more operations described herein in connection with FIGS. 6-7. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the repeater network node described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the repeater network node described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the repeater network node described in connection with FIG. 2. In some aspects, the transmission component 1004 may be co-located with the reception component 1002 in a transceiver.

The obtaining component 1008 may obtain a measurement gap configuration that indicates a measurement gap to be used by the repeater network node for performing a measurement. The reception component 1002 may receive a downlink signal from a transmitter network node. The transmission component 1004 may transmit the downlink signal, to a UE, based at least in part on the downlink signal being received during the measurement gap.

The generation component 1010 may generate an amplified downlink signal based at least in part on applying an amplification factor to the downlink signal, wherein transmitting the downlink signal comprises transmitting the amplified downlink signal. The reception component 1002 may receive an indication to transmit the downlink signal using a communication resource that overlaps with the measurement gap. The determination component 1012 may determine not to perform a transmission of the downlink signal during the measurement gap.

The reception component 1002 may receive an indication to transmit the downlink signal using a communication resource that overlaps with the measurement gap. The transmission component 1004 may prioritize a transmission of the downlink signal during the measurement gap. The reception component 1002 may receive an indication of one or more conditions for transmitting downlink signals during the measurement gap, wherein transmitting the downlink signal comprises transmitting the downlink signal in accordance with the one or more conditions. The adaptation component 1014 may adapt a bandwidth for transmitting the downlink signal based at least in part on an indication that the downlink signal is to be transmitted during the measurement gap.

The obtaining component 1008 may obtain another measurement gap configuration that indicates another measurement gap, wherein the other measurement gap overlaps with the measurement gap. The adaptation component 1014 may adapt a bandwidth for transmitting the downlink signal based at least in part on an indication that the downlink signal is to be transmitted during the measurement gap or during the other measurement gap. The adaptation component 1014 may adapt a beam configuration based at least in part on an indication that the downlink signal is to be transmitted during the measurement gap. The obtaining component 1008 may obtain an indication of an access beam configuration or a fronthaul beam configuration for transmitting downlink signals during the measurement gap, wherein transmitting the downlink signal comprises transmitting the downlink signal in accordance with the access beam configuration or the fronthaul beam configuration.

The reception component 1002 may receive another downlink signal during another measurement gap associated with the measurement gap configuration, wherein receiving the other downlink signal during the other measurement gap comprises receiving the other downlink signal during the other measurement gap prior to receiving the downlink signal during the measurement gap, and wherein transmitting the downlink signal comprises transmitting the downlink signal based at least in part on a measurement condition associated with the other downlink signal.

The reception component 1002 may receive an indication of the measurement condition from the transmitter network node. The reception component 1002 may receive another downlink signal during another measurement gap associated with the measurement gap configuration, wherein receiving the other downlink signal during the other measurement gap comprises receiving the other downlink signal during the other measurement gap prior to receiving the downlink signal during the measurement gap. The transmission component 1004 may transmit, to the transmitter network node, a measurement associated with the other downlink signal. The reception component 1002 may receive, from the transmitter network node, an indication of whether to transmit the downlink signal based at least in part on the measurement associated with the other downlink signal.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
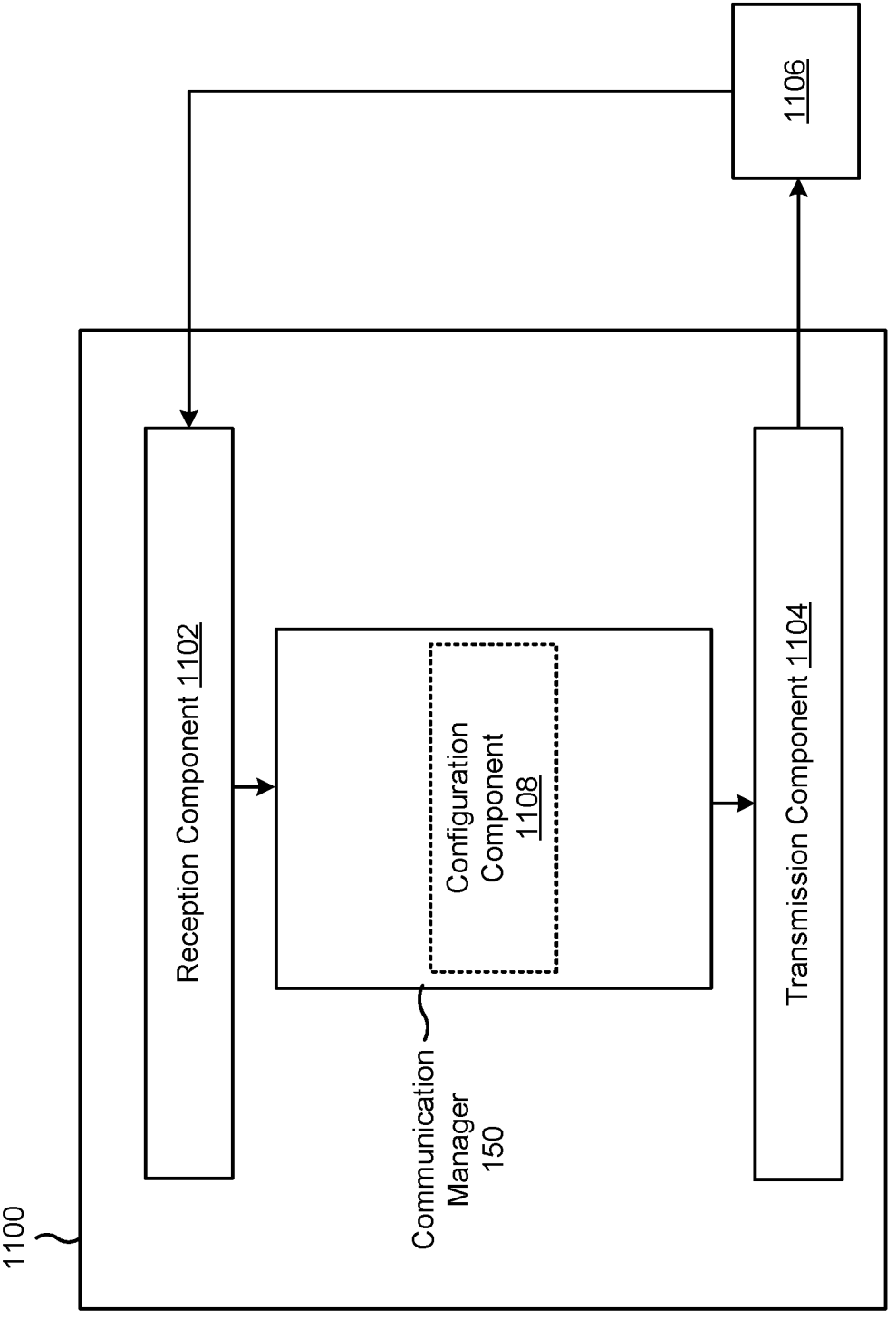
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a transmitter network node, or a transmitter network node may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 150. The communication manager 150 may include a configuration component 1108, among other examples.

In some aspects, the apparatus 1100 may be configured to perform one or more operations described herein in connection with FIGS. 6-7. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the transmitter network node described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the transmitter network node described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the transmitter network node described in connection with FIG. 2. In some aspects, the transmission component 1104 may be co-located with the reception component 1102 in a transceiver.

The transmission component 1104 and/or the configuration component 1108 may transmit a first measurement gap configuration, to a repeater network node, that indicates a first measurement gap to be used by the repeater network node for performing measurements. The transmission component 1104 may transmit a second measurement gap configuration, to a user equipment (UE) that is served by the repeater network node, that indicates a second measurement gap to be used by the UE for performing measurements and that at least partially overlaps with the first measurement gap. The reception component 1102 may receive, from the UE, a measurement report that is associated with a downlink signal transmitted by the repeater network node to the UE during a portion of the second measurement gap that overlaps with the first measurement gap.

The transmission component 1104 may transmit an indication to forward the downlink signal using a communication resource that overlaps with the measurement gap. The transmission component 1104 may transmit an indication of one or more conditions for forwarding downlink signals during the measurement gap. The transmission component 1104 may transmit an indication of an access beam configuration or a fronthaul beam configuration for forwarding downlink signals during the measurement gap.

The transmission component 1104 may transmit another downlink signal during another measurement gap associated with the measurement gap configuration, wherein transmitting the other downlink signal during the other measurement gap comprises transmitting the other downlink signal during the other measurement gap prior to transmitting the downlink signal during the measurement gap. The reception component 1102 may receive, from the repeater network node, a measurement associated with the other downlink signal. The transmission component 1104 may transmit, to the repeater network node, an indication of whether to forward the downlink signal based at least in part on the measurement associated with the other downlink signal.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a repeater network node, comprising: obtaining a measurement gap configuration that indicates a measurement gap to be used by the repeater network node for performing a measurement; receiving a downlink signal from a transmitter network node; and transmitting the downlink signal, to a user equipment (UE), based at least in part on the downlink signal being received during the measurement gap.

Aspect 2: The method of Aspect 1, further comprising generating an amplified downlink signal based at least in part on applying an amplification factor to the downlink signal, wherein transmitting the downlink signal comprises transmitting the amplified downlink signal.

Aspect 3: The method of any of Aspects 1-2, wherein transmitting the downlink signal to the UE comprises transmitting the downlink signal to the UE via an access interface associated with the repeater network node.

Aspect 4: The method of any of Aspects 1-3, wherein the measurement gap configuration that indicates the measurement gap is a synchronization signal block (SSB) measurement transmission configuration (SMTC) that indicates a measurement window that is within the measurement gap.

Aspect 5: The method of Aspect 4, wherein receiving the downlink signal comprises receiving an SSB signal, and wherein transmitting the downlink signal comprises transmitting the SSB signal based at least in part on the SSB signal being received during the measurement window.

Aspect 6: The method of any of Aspects 1-5, further comprising: receiving an indication to transmit the downlink signal using a communication resource that overlaps with the measurement gap; and determining not to perform a transmission of the downlink signal during the measurement gap.

Aspect 7: The method of any of Aspects 1-6, further comprising: receiving an indication to transmit the downlink signal using a communication resource that overlaps with the measurement gap; and prioritizing a transmission of the downlink signal during the measurement gap.

Aspect 8: The method of any of Aspects 1-7, further comprising receiving an indication of one or more conditions for transmitting downlink signals during the measurement gap, wherein transmitting the downlink signal comprises transmitting the downlink signal in accordance with the one or more conditions.

Aspect 9: The method of Aspect 8, wherein the one or more conditions indicate that the downlink signal is to be transmitted using a select measurement gap configuration or a plurality of select measurement gap configurations, wherein transmitting the downlink signal comprises transmitting the downlink signal based at least in part on the measurement gap configuration being the select measurement gap configuration or being included in the plurality of select measurement gap configurations.

Aspect 10: The method of Aspect 8, wherein the one or more conditions indicate that the downlink signal is to be transmitted using a select measurement gap or a plurality of select measurement gaps of the measurement gap configuration, wherein transmitting the downlink signal comprises transmitting the downlink signal based at least in part on the measurement gap being the select measurement gap or being included in the plurality of select measurement gaps.

Aspect 11: The method of Aspect 8, wherein the one or more conditions indicate that the downlink signal is to be transmitted using a frequency band, and wherein transmitting the downlink signal comprises transmitting the downlink signal based at least in part on an association between the measurement gap configuration and the frequency band.

Aspect 12: The method of Aspect 8, wherein receiving the indication of the one or more conditions comprises receiving a radio resource control message, a medium access control message, or downlink control information that includes the indication of the one or more conditions.

Aspect 13: The method of any of Aspects 1-12, further comprising adapting a bandwidth for transmitting the downlink signal based at least in part on an indication that the downlink signal is to be transmitted during the measurement gap.

Aspect 14: The method of any of Aspects 1-13, further comprising: obtaining another measurement gap configuration that indicates another measurement gap, wherein the other measurement gap overlaps with the measurement gap; and adapting a bandwidth for transmitting the downlink signal based at least in part on an indication that the downlink signal is to be transmitted during the measurement gap or during the other measurement gap.

Aspect 15: The method of any of Aspects 1-14, further comprising adapting a beam configuration based at least in part on an indication that the downlink signal is to be transmitted during the measurement gap.

Aspect 16: The method of Aspect 15, wherein adapting the beam configuration comprises switching to a wider access beam for at least a portion of a duration of the measurement gap.

Aspect 17: The method of any of Aspects 1-16, further comprising obtaining an indication of an access beam configuration or a fronthaul beam configuration for transmitting downlink signals during the measurement gap, wherein transmitting the downlink signal comprises transmitting the downlink signal in accordance with the access beam configuration or the fronthaul beam configuration.

Aspect 18: The method of Aspect 17, wherein the indication of the access beam configuration or the fronthaul beam configuration includes an indication of the measurement gap configuration, an indication of a plurality of measurement gap configurations that includes the measurement gap configuration, or an indication of a plurality of measurement gaps that includes the measurement gap.

Aspect 19: The method of Aspect 17, wherein the indication of the access beam configuration or the fronthaul beam configuration indicates one or more recommended beams or one or more restricted beams.

Aspect 20: The method of Aspect 17, wherein obtaining the indication of the access beam configuration or the fronthaul beam configuration comprises receiving a radio resource control message, a medium access control message, or downlink control information that includes the indication of the access beam configuration or the fronthaul beam configuration.

Aspect 21: The method of any of Aspects 1-20, further comprising receiving another downlink signal during another measurement gap associated with the measurement gap configuration, wherein receiving the other downlink signal during the other measurement gap comprises receiving the other downlink signal during the other measurement gap prior to receiving the downlink signal during the measurement gap, and wherein transmitting the downlink signal comprises transmitting the downlink signal based at least in part on a measurement condition associated with the other downlink signal.

Aspect 22: The method of Aspect 21, further comprising receiving an indication of the measurement condition from the transmitter network node.

Aspect 23: The method of any of Aspects 1-22, further comprising: receiving another downlink signal during another measurement gap associated with the measurement gap configuration, wherein receiving the other downlink signal during the other measurement gap comprises receiving the other downlink signal during the other measurement gap prior to receiving the downlink signal during the measurement gap; transmitting, to the transmitter network node, a measurement associated with the other downlink signal; and receiving, from the transmitter network node, an indication of whether to transmit the downlink signal based at least in part on the measurement associated with the other downlink signal.

Aspect 24: The method of any of Aspects 1-23, wherein the measurement gap configuration at least partially overlaps with a measurement gap configuration of the UE.

Aspect 25: The method of any of Aspects 1-24, wherein obtaining the measurement gap configuration comprises receiving the measurement gap configuration from the transmitter network node or another transmitter network node.

Aspect 26: A method of wireless communication performed by a transmitter network node, comprising: transmitting a first measurement gap configuration, to a repeater network node, that indicates a first measurement gap to be used by the repeater network node for performing measurements; transmitting a second measurement gap configuration, to a user equipment (UE) that is served by the repeater network node, that indicates a second measurement gap to be used by the UE for performing measurements and that at least partially overlaps with the first measurement gap; and receiving, from the UE, a measurement report that is associated with a downlink signal transmitted by the repeater network node to the UE during a portion of the second measurement gap that overlaps with the first measurement gap.

Aspect 27: The method of Aspect 26, wherein the first measurement gap configuration is a synchronization signal block (SSB) measurement transmission configuration (SMTC) that indicates a measurement window that is within the first measurement gap.

Aspect 28: The method of any of Aspects 26-27, further comprising transmitting an indication to forward the downlink signal using a communication resource that overlaps with the measurement gap.

Aspect 29: The method of any of Aspects 26-28, further comprising transmitting an indication of one or more conditions for forwarding downlink signals during the measurement gap.

Aspect 30: The method of Aspect 29, wherein the one or more conditions indicate: that the downlink signal is to be forwarded using a select measurement gap configuration or a plurality of select measurement gap configurations; that the downlink signal is to be forwarded using a select measurement gap or a plurality of select measurement gaps of the measurement gap configuration; or that downlink signal is to be forwarded using a particular frequency band.

Aspect 31: The method of any of Aspects 26-30, further comprising transmitting an indication of an access beam configuration or a fronthaul beam configuration for forwarding downlink signals during the measurement gap.

Aspect 32: The method of Aspect 31, wherein the indication of the access beam configuration or the fronthaul beam configuration indicates one or more recommended beams or one or more restricted beams.

Aspect 33: The method of any of Aspects 26-32, further comprising: transmitting an indication to the repeater network node that instructs the repeater network node to transmit the downlink signal to the UE.

Aspect 34: An apparatus for wireless communication at a device, comprising a processor; memory coupled with the processor; and instructions stored in the memory and executable by the processor to cause the apparatus to perform the method of one or more of Aspects 1-25.

Aspect 35: A device for wireless communication, comprising a memory and one or more processors coupled to the memory, the one or more processors configured to perform the method of one or more of Aspects 1-25.

Aspect 36: An apparatus for wireless communication, comprising at least one means for performing the method of one or more of Aspects 1-25.

Aspect 37: A non-transitory computer-readable medium storing code for wireless communication, the code comprising instructions executable by a processor to perform the method of one or more of Aspects 1-25.

Aspect 38: A non-transitory computer-readable medium storing a set of instructions for wireless communication, the set of instructions comprising one or more instructions that, when executed by one or more processors of a device, cause the device to perform the method of one or more of Aspects 1-25.

Aspect 39: An apparatus for wireless communication at a device, comprising a processor; memory coupled with the processor; and instructions stored in the memory and executable by the processor to cause the apparatus to perform the method of one or more of Aspects 26-33.

Aspect 40: A device for wireless communication, comprising a memory and one or more processors coupled to the memory, the one or more processors configured to perform the method of one or more of Aspects 26-33.

Aspect 41: An apparatus for wireless communication, comprising at least one means for performing the method of one or more of Aspects 26-33.

Aspect 42: A non-transitory computer-readable medium storing code for wireless communication, the code comprising instructions executable by a processor to perform the method of one or more of Aspects 26-33.

Aspect 43: A non-transitory computer-readable medium storing a set of instructions for wireless communication, the set of instructions comprising one or more instructions that, when executed by one or more processors of a device, cause the device to perform the method of one or more of Aspects 26-33.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A repeater network node, comprising:
one or more antennas; and
a processing system that includes one or more processors and one or more memories that store code and are coupled with the one or more processors, the processing system configured to cause the repeater network node to:
obtain a first synchronization signal block (SSB) measurement transmission configuration (SMTC) that indicates a first measurement window within a first measurement gap, to be used by the repeater network node, that is at least partially overlapping with a second measurement gap,
wherein a second SMTC indicates a second measurement window within the second measurement gap,
wherein the first measurement gap is a first period of time during which the repeater network node can perform a measurement, and
wherein the second measurement gap is a second period of time during which a user equipment (UE) can perform a measurement;
receive a downlink signal from a transmitter network node during the first measurement window; and
transmit the downlink signal, to the UE, based at least in part on the downlink signal being received during the first measurement window.

2. The repeater network node of claim 1, wherein the one or more processors are further configured to generate an amplified downlink signal based at least in part on an application of an amplification factor to the downlink signal; and
wherein the one or more processors, to transmit the downlink signal, are configured to:
transmit the amplified downlink signal.

3. The repeater network node of claim 1, wherein the one or more processors, to receive the downlink signal, are configured to:
receive an SSB signal; and
wherein the one or more processors, to transmit the downlink signal, are configured to:
transmit the SSB signal based at least in part on the SSB signal being received during the first measurement window.

4. The repeater network node of claim 1, wherein the one or more processors are further configured to:
receive an indication to transmit the downlink signal using a communication resource that overlaps with the first measurement gap; and
prioritize a transmission of the downlink signal during the first measurement gap.

5. The repeater network node of claim 1, wherein the one or more processors are further configured to receive an indication of one or more conditions for transmitting downlink signals during the first measurement gap; and
wherein the one or more processors, to transmit the downlink signal, are configured to:
transmit the downlink signal in accordance with the one or more conditions.

6. The repeater network node of claim 5, wherein the one or more conditions indicate that the downlink signal is to be transmitted using a select measurement gap configuration or a plurality of select measurement gap configurations; and
wherein the one or more processors, to transmit the downlink signal, are configured to:
transmit the downlink signal based at least in part on the select measurement gap configuration or the plurality of select measurement gap configurations.

7. The repeater network node of claim 5, wherein the one or more conditions indicate that the downlink signal is to be transmitted using a select measurement gap or a plurality of select measurement gaps; and
wherein the one or more processors, to transmit the downlink signal, are configured to:
transmit the downlink signal based at least in part on the first measurement gap being the select measurement gap or being included in the plurality of select measurement gaps.

8. The repeater network node of claim 5, wherein the one or more conditions indicate that the downlink signal is to be transmitted using a frequency band; and
wherein the one or more processors, to transmit the downlink signal, are configured to:
transmit the downlink signal based at least in part on an association between the first SMTC and the frequency band.

9. The repeater network node of claim 1, wherein the one or more processors are further configured to adapt a bandwidth for transmitting the downlink signal based at least in part on an indication that the downlink signal is to be transmitted during the first measurement gap.

10. The repeater network node of claim 1, wherein the one or more processors are further configured to:
obtain the second SMTC; and
adapt a bandwidth for transmitting the downlink signal based at least in part on an indication that the downlink signal is to be transmitted during the first measurement gap or during the second measurement gap.

11. The repeater network node of claim 1, wherein the one or more processors are further configured to adapt a beam configuration based at least in part on an indication that the downlink signal is to be transmitted during the first measurement gap.

12. The repeater network node of claim 1, wherein the one or more processors are further configured to obtain an indication of an access beam configuration or a fronthaul beam configuration for transmitting downlink signals during the first measurement gap; and
wherein the one or more processors, to transmit the downlink signal, are configured to:
transmit the downlink signal in accordance with the access beam configuration or the fronthaul beam configuration.

13. The repeater network node of claim 12, wherein the indication of the access beam configuration or the fronthaul beam configuration includes an indication of the first SMTC, an indication of a plurality of measurement gap configurations that includes the first SMTC, or an indication of a plurality of measurement gaps that includes the first measurement gap.

14. The repeater network node of claim 12, wherein the indication of the access beam configuration or the fronthaul beam configuration indicates one or more recommended beams or one or more restricted beams.

15. The repeater network node of claim 1, wherein the one or more processors are further configured to receive another downlink signal during another measurement gap associated with the first SMTC prior to receiving the downlink signal during the first measurement window; and wherein the one or more processors, to transmit the downlink signal, are configured to:

transmit the downlink signal based at least in part on a measurement condition associated with the other downlink signal.

16. The repeater network node of claim 1, wherein the one or more processors are further configured to:

receive another downlink signal during another measurement gap associated with the first SMTC prior to receiving the downlink signal during the first measurement window;

transmit, to the transmitter network node, a measurement associated with the other downlink signal; and receive, from the transmitter network node, an indication of whether to transmit the downlink signal based at least in part on the measurement associated with the other downlink signal.

17. The repeater network node of claim 1, wherein the one or more processors, to transmit the downlink signal to the UE, are configured to transmit the downlink signal to the UE via an access interface associated with the repeater network node.

18. A method of wireless communication performed by a repeater network node, comprising:

obtaining a first synchronization signal block (SSB) measurement transmission configuration (STMC) that indicates a first measurement window within a first measurement gap, to be used by the repeater network node, that is at least partially overlapping with a second measurement gap, wherein a second SMTC indicates a second measurement window within the second measurement gap, wherein the first measurement gap is a first period of time during which the repeater network node can perform a measurement, and wherein the second measurement gap is a second period of time during which a user equipment (UE) can perform a measurement;

receiving a downlink signal from a transmitter network node during the first measurement window; and transmitting the downlink signal, to the UE, based at least in part on the downlink signal being received during the first measurement window.

19. The method of claim 18, further comprising generating an amplified downlink signal based at least in part on applying an amplification factor to the downlink signal, wherein transmitting the downlink signal comprises transmitting the amplified downlink signal.

20. The method of claim 18, further comprising receiving an indication of one or more conditions for transmitting downlink signals during the first measurement gap, wherein transmitting the downlink signal comprises transmitting the downlink signal in accordance with the one or more conditions.

21. The method of claim 18, wherein receiving the downlink signal comprises receiving an SSB signal; and wherein transmitting the downlink signal comprises transmitting the SSB signal based at least in part on the SSB signal being received during the first measurement window.

22. The method of claim 18, further comprising:

receiving an indication to transmit the downlink signal using a communication resource that overlaps with the first measurement gap; and prioritizing a transmission of the downlink signal during the first measurement gap.

23. The method of claim 18, further comprising:

receiving an indication of one or more conditions for transmitting downlink signals during the first measurement gap; and wherein transmitting the downlink signal comprises transmitting the downlink signal in accordance with the one or more conditions.

24. The method of claim 23, wherein the one or more conditions indicate that the downlink signal is to be transmitted using a select measurement gap configuration or a plurality of select measurement gap configurations; and wherein transmitting the downlink signal comprises transmitting the downlink signal based at least in part on the select measurement gap configuration or the plurality of select measurement gap configurations.

25. An apparatus for wireless communication, comprising:

means for obtaining a first synchronization signal block (SSB) measurement transmission configuration (SMTC) that indicates a first measurement window within a first measurement gap, to be used by a repeater network node, that is at least partially overlapping with a second measurement gap, wherein a second SMTC indicates a second measurement window within the second measurement gap, wherein the first measurement gap is a first period of time during which the repeater network node can perform a measurement, and wherein the second measurement gap is a second period of time during which a user equipment (UE) can perform a measurement;

means for receiving a downlink signal from a transmitter network node during the first measurement window; and means for transmitting the downlink signal, to the UE, based at least in part on the downlink signal being received during the first measurement window.

26. The apparatus of claim 25, further comprising:

means for generating an amplified downlink signal based at least in part on applying an amplification factor to the downlink signal; and wherein the means for transmitting the downlink signal comprises:

means for transmitting the amplified downlink signal.

27. The apparatus of claim 25, further comprising:

means for receiving an indication of one or more conditions for transmitting downlink signals during the first measurement gap; and wherein the means for transmitting the downlink signal comprises:

means for transmitting the downlink signal in accordance with the one or more conditions.

28. A method of wireless communication performed by a transmitter network node, comprising:

transmitting a first synchronization signal block (SSB) measurement transmission configuration (SMTC), to a repeater network node, that indicates a first measurement window within a first measurement gap to be used by the repeater network node, wherein the first measurement gap is a first period of time during which the repeater network node can perform measurements;

transmitting a second SMTC, to a user equipment (UE) that is served by the repeater network node, that indicates a second measurement window within a second measurement gap to be used by the UE, wherein the second measurement gap is a second period of time during which the UE can perform measurements, and wherein the second measurement gap at least partially overlaps with the first measurement gap; and receiving, from the UE, a measurement report that is associated with a downlink signal transmitted by the repeater network node to the UE during a portion of the second measurement gap that overlaps with the first measurement gap.

29. The method of claim 28, further comprising:

transmitting an indication to the repeater network node that instructs the repeater network node to transmit the downlink signal to the UE.

30. The method of claim 28, further comprising:

transmitting, to the repeater network node, an indication of one or more conditions for forwarding downlink signals during the first measurement gap, wherein the one or more conditions indicate:

that the downlink signal is to be forwarded using a select measurement gap configuration or a plurality of select measurement gap configurations;

that the downlink signal is to be forwarded using a select measurement gap or a plurality of select measurement gaps of the first SMTC; or that the downlink signal is to be forwarded using a particular frequency band.

\* \* \* \* \*